(12) United States Patent
Nordquist

(10) Patent No.: US 7,447,873 B1
(45) Date of Patent: *Nov. 4, 2008

(54) MULTITHREADED SIMD PARALLEL PROCESSOR WITH LOADING OF GROUPS OF THREADS

(75) Inventor: Bryon S. Nordquist, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/289,828

(22) Filed: Nov. 29, 2005

(51) Int. Cl.
*G06F 9/30* (2006.01)
*G06F 9/40* (2006.01)
*G06F 15/00* (2006.01)

(52) U.S. Cl. .................. 712/22; 712/2; 712/7

(58) Field of Classification Search ............. 712/2, 712/7, 22, 220
See application file for complete search history.

(56) References Cited

U.S. PATENT DOCUMENTS

| | | | | |
|---|---|---|---|---|
| 4,910,667 A | * | 3/1990 | Tanaka et al. | 711/168 |
| 5,237,702 A | * | 8/1993 | Hayashi et al. | 712/7 |
| 5,499,350 A | * | 3/1996 | Uchida et al. | 712/220 |
| 5,881,302 A | * | 3/1999 | Omata | 712/2 |
| 5,961,628 A | * | 10/1999 | Nguyen et al. | 712/2 |
| 6,665,749 B1 | * | 12/2003 | Ansari | 710/29 |
| 6,839,828 B2 | * | 1/2005 | Gschwind et al. | 712/20 |
| 6,897,871 B1 | * | 5/2005 | Morein et al. | 345/501 |
| 7,191,317 B1 | * | 3/2007 | Wilson | 712/224 |
| 2002/0174318 A1 | | 11/2002 | Stuttard et al. | |
| 2005/0108720 A1 | * | 5/2005 | Cervini | 718/105 |

OTHER PUBLICATIONS

Espasa et al.; Simultaneous Multithreaded Vector Architecture: Merging ILP and DLP for High Performance; 1997; IEEE Computer Society; HiPC'97; pp. 350-357.*
Limousin et al.; Improving 3D Geometry Transformations on a Simultaneous Multithreaded SIMD Processor; 2001; ACM Press; ICS '01; pp. 236-245.*
Shen et al.; Modern Processor Design: Fundamentals of Superscalar Processors; Jul. 2002; McGraw-Hill; Beta Edition; pp. 442-444.*
Eggers et al. "Simultaneous multithreading: A platform for next-generation processors" IEEE Micro, Sep./Oct. 1997(vol. 17, No. 5) pp. 12-19.

* cited by examiner

*Primary Examiner*—Eddie P Chan
*Assistant Examiner*—Corey S Faherty
(74) *Attorney, Agent, or Firm*—Townsend and Townsend and Crew LLP

(57) ABSTRACT

In a multithreaded processing core, groups of threads are executed using single instruction, multiple data (SIMD) parallelism by a set of parallel processing engines. Input data defining objects to be processed received as a stream of input data blocks, and the input data blocks are loaded into a local register file in the core such that all of the data for one of the input objects is accessible to one of the processing engines. The input data can be loaded directly into the local register file, or the data can be accumulated in a buffer and loaded after accumulation, for instance during a launch operation for a SIMD group. Shared input data can also be loaded into a shared memory in the processing core.

21 Claims, 15 Drawing Sheets

MULTITHREADED SIMD PARALLEL PROCESSOR WITH LOADING OF GROUPS OF THREADS

CROSS-REFERENCES TO RELATED APPLICATIONS

The present disclosure is related to U.S. patent application Ser. No. 11/290,303, filed of even date herewith, entitled "Multithreaded SIMD Parallel Processor with Launching of Groups of Threads."

BACKGROUND OF THE INVENTION

The present invention relates in general to parallel data processing, and in particular to a multithreaded parallel processor with loading of groups of threads for single-instruction, multiple data (SIMD execution).

Parallel processing techniques enhance throughput of a processor or multiprocessor system when multiple independent computations need to be performed. A computation can be divided into tasks that are defined by programs, with each task being performed as a separate thread. (As used herein, a "thread" refers generally to an instance of execution of a particular program using particular input data, and a "program" refers to a sequence of executable instructions that produces result data from input data.) Parallel threads are executed simultaneously using different processing engines inside the processor.

Numerous existing processor architectures support parallel processing. The earliest such architectures used multiple discrete processors networked together. More recently, multiple processing cores have been fabricated on a single chip. These cores are controlled in various ways. In some instances, known as multiple-instruction, multiple data (MIMD) machines, each core independently fetches and issues its own instructions to its own processing engine (or engines). In other instances, known as single-instruction, multiple-data (SIMD) machines, a core has a single instruction unit that issues the same instruction in parallel to multiple processing engines, which execute the instruction on different input operands. SIMD machines generally have advantages in chip area (since only one instruction unit is needed) and therefore cost; the downside is that parallelism is only available to the extent that multiple instances of the same instruction can be executed concurrently.

Conventional graphics processors use very wide SIMD architectures to achieve high throughput in image-rendering applications. Such applications generally entail executing the same programs (vertex shaders or pixel shaders) on large numbers of objects (vertices or pixels). Since each object is processed independently of all others but using the same sequence of operations, a SIMD architecture provides considerable performance enhancement at reasonable cost. Typically, a GPU includes one SIMD core that executes vertex shader programs, and another SIMD core of comparable size that executes pixel shader programs. In high-end GPUs, multiple sets of SIMD cores are sometimes provided to support an even higher degree of parallelism.

These designs have several shortcomings. First, the separate processing cores for vertex and shader programs are separately designed and tested, often leading to at least some duplication of effort. Second, the division of the graphics processing load between vertex operations and pixel operations varies greatly from one application to another. As is known in the art, detail can be added to an image by using many small primitives, which increases the load on the vertex shader core, and/or by using complex texture-mapping and pixel shading operations, which increases the load on the pixel shader core. In most cases, the loads are not perfectly balanced, and one core or the other is underused. For instance, in a pixel-intensive application, the pixel shader core may run at maximum throughput while the vertex core is idle, waiting for already-processed vertices to move into the pixel shader stage of the pipeline. Conversely, in a vertex-intensive application, the vertex shader core may run at maximum throughput while the pixel core is idle, waiting for new vertices to be supplied. In either case, some fraction of available processing cycles are effectively wasted.

It would therefore be desirable to provide a graphics processor that can adapt to varying loads on different shaders while maintaining a high degree of parallelism.

BRIEF SUMMARY OF THE INVENTION

Embodiments of the present invention relate to a multithreaded processing core in which groups of threads are executed using single-instruction, multiple-data (SIMD) parallelism by a set of parallel processing engines. Input data (also referred to herein as per-thread input data) defining objects to be processed received as a stream of input data blocks, and the input data blocks are loaded into a local register file in the core such that all of the data for one of the input objects is accessible to one of the processing engines. The input data can be loaded directly into the local register file, or the data can be accumulated in a buffer during a launch operation. In some embodiments, loading and launching of SIMD groups is managed by core interface logic that includes at least one load module configured to receive the stream of input data blocks defining the input objects to be processed and to load the input data blocks into the local register file and a launch module configured to signal the processing core to begin execution of a new SIMD group, where each thread in the new SIMD group processes a different one of the input objects.

According to one aspect of the present invention, a processor has a processing core and core interface logic coupled to the processing core. The processing core includes processing engines configured to concurrently execute threads arranged in multiple single-instruction, multiple-data (SIMD) groups, each SIMD group including up to a maximum number P of threads, where threads in the same the SIMD group execute the same data processing program. The processing core also includes a local register file having at least P lanes, and each processing engine accesses a different subset of the lanes. The core interface logic, which is configured to initiate execution by the processing core of one or more SIMD groups, includes a first load module and a first launch module. The first load module is configured to receive a stream of input data blocks defining a number of first input objects to be processed and to load the input data blocks into the local register file such that the input data for each one of the first input objects is in a different one of the lanes of the local register file. The first launch module, which is coupled to the first load module, is configured to signal the processing core to begin execution of a first SIMD group, where each thread of the first SIMD group processes a different one of the first input objects.

Loading of input data can be managed in various ways. In some embodiments, the first load module is configured to load each input data block into the local register file as the input data block is received. If each of the input data blocks includes a number of data words, each data word representing a value of a same attribute of a different one of the first input objects, the first load module can advantageously be configured to steer each data word to a corresponding entry in a different lane of the local register file. In some embodiments, the number of data words in each input data block is less than P.

In other embodiments, the first load module includes an input data buffer. The first load module can be configured to load the input data blocks into the input data buffer and to transfer the input data from the buffer to the local register file during a launch operation.

In some embodiments, the core interface logic also includes a resource allocation module configured to allocate a sufficient amount of a resource in the processing core for use in processing each SIMD group. The first load module can be configured to request an allocation of resources for the first SIMD group from the resource allocation module in response to receiving a first input data block in the stream and to delay receiving further input data blocks until a response to the request is received from the resource allocation module. The resource allocation module can be configured to delay the response to the request until a sufficient amount of the resource is available in the processing core; accordingly, in some embodiments, data is loaded only when sufficient resources are known to be available in the processing core.

Various resources can be managed in this manner, including but not limited to space in the local register file and/or a register in a program counter array that can be used to store a program counter for the first SIMD group.

In some embodiments, the core interface logic also includes a shared memory load module that is configured to receive a stream of shared input data to be used by more than one of the threads of the first SIMD group and to load the shared input data into a shared memory in the processing core. The first launch module can be further configured to provide to the processing engines a reference to a location in the shared memory where the shared input data to be used during execution of the threads of the first SIMD group is stored.

In some embodiments, the core interface logic also includes a second load module and a second launch module. The second load module can be configured to receive a stream of input data blocks defining a set of second input objects to be processed and to load the input data blocks into the local register file such that the input data for each one of the second input objects is in a different one of the lanes of the local register file. The second launch module, which is coupled to the second load module, can be configured to signal the processing core to begin execution of a second SIMD group, wherein each thread of the second SIMD group processes a different one of the second input objects. The first input objects and the second input objects are objects of different types; for instance, the first input objects might be vertex objects while the second input objects are pixel objects.

According to another aspect of the present invention, a processor includes multiple processing cores and core interface logic coupled to more than one of the processing cores. Each processing core has multiple processing engines configured to concurrently execute a threads arranged in multiple single-instruction, multiple-data (SIMD) groups, each SIMD group including up to a maximum number P of threads, where threads in a same one of the SIMD groups execute a same data processing program. Each processing core also has a local register file having at least P lanes, and each processing engine accesses a different subset of the lanes. The core interface logic, which is configured to initiate execution by a selected one of the processing cores of one or more SIMD groups, includes a first load module and a first launch module. The first load module is configured to receive a stream of input data blocks defining a set of first input objects to be processed and to load the input data blocks into the local register file of the selected one of the processing cores such that the input data for each one of the first input objects is a different one of the lanes in the local register file. The first launch module, which is coupled to the first load module, is configured to signal the selected one of the processing core to begin execution of a first SIMD group, wherein each thread of the first SIMD group processes a different one of the first input objects.

In some embodiments, the core interface logic is configured to select the one of the processing cores into which the input data blocks are loaded. In other embodiments, the core interface logic is further configured to receive a signal selecting the one of the processing cores into which the input data blocks are loaded.

According to yet another aspect of the present invention, a method for executing a plurality of data-processing threads in a multithreaded processor includes receiving a stream of input data blocks defining a set of input objects to be processed. Each input object is to be processed by a different thread in a multithreaded processing core. The core, which has multiple processing engines, is configured to concurrently execute threads arranged in multiple single-instruction, multiple-data (SIMD) groups. Each SIMD group includes a maximum number P of threads, and all threads in a same one of the SIMD groups execute a same data processing program. A sufficient number of entries in each of a plurality of lanes in a local register file of the processing core is allocated to store the input data for up to P input objects. Each lane is accessible by one of the processing engines. The input data blocks are loaded into the allocated entries such that the input data for each one of the input objects is in a different one of the lanes of the local register file. Subsequently to loading the input data blocks, the processing core is signaled to begin execution of the SIMD group.

In some embodiments, the act of allocating is performed in response to receiving a first input data block, and the input data blocks can be loaded directly into the allocated space. For example, in one embodiment the stream of input data blocks includes a first input data block including a number of first data words representing a first attribute of the object for each of a first subset of the input objects and a second data block including a plurality of second data words representing a second attribute of the object for each of the first subset of the input objects. The first data words can be loaded into respective first entries in each of a first subset of the lanes in the register file, and the second data words can be loaded into respective second entries in each of the first plurality of lanes in the register file.

In other embodiments, the input data blocks are stored in a buffer as they are received, and the act of loading the input data blocks includes transferring the input data blocks from the buffer to the allocated entries. The act of allocating can be performed in response to the buffer becoming filled with input data blocks or before the buffer is filled with input data, as desired.

In some embodiments, shared input data to be used by more than one of the threads is received. Such shared input data can be loaded into a shared memory in the processing core.

The following detailed description together with the accompanying drawings will provide a better understanding of the nature and advantages of the present invention.

DETAILED DESCRIPTION OF THE INVENTION

Embodiments of the present invention relate to a multi-threaded processing core in which groups of threads are executed using single-instruction, multiple-data (SIMD) parallelism by a set of parallel processing engines. Input data (also referred to herein as per-thread input data) defining objects to be processed received as a stream of input data blocks, and the input data blocks are loaded into a local register file in the core such that all of the data for one of the input objects is accessible to one of the processing engines. The input data can be loaded directly into the local register file, or the data can be accumulated in a buffer during a launch operation. In some embodiments, loading and launching of SIMD groups is managed by core interface logic that includes at least one load module configured to receive the stream of input data blocks defining the input objects to be processed and to load the input data blocks into the local register file and a launch module configured to signal the processing core to begin execution of a new SIMD group, where each thread in the new SIMD group processes a different one of the input objects.

System Overview

Figure 1:
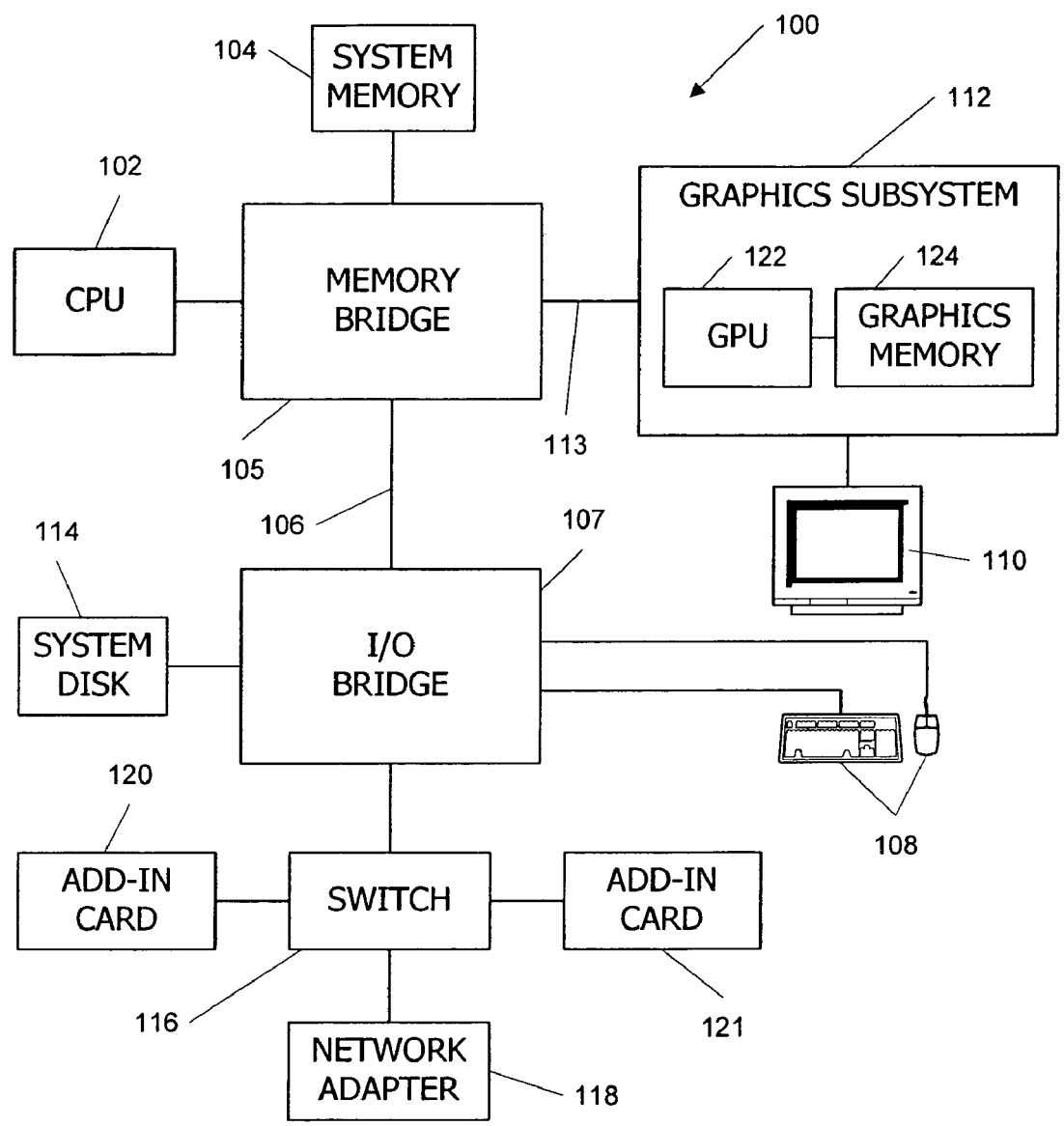
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional;

for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
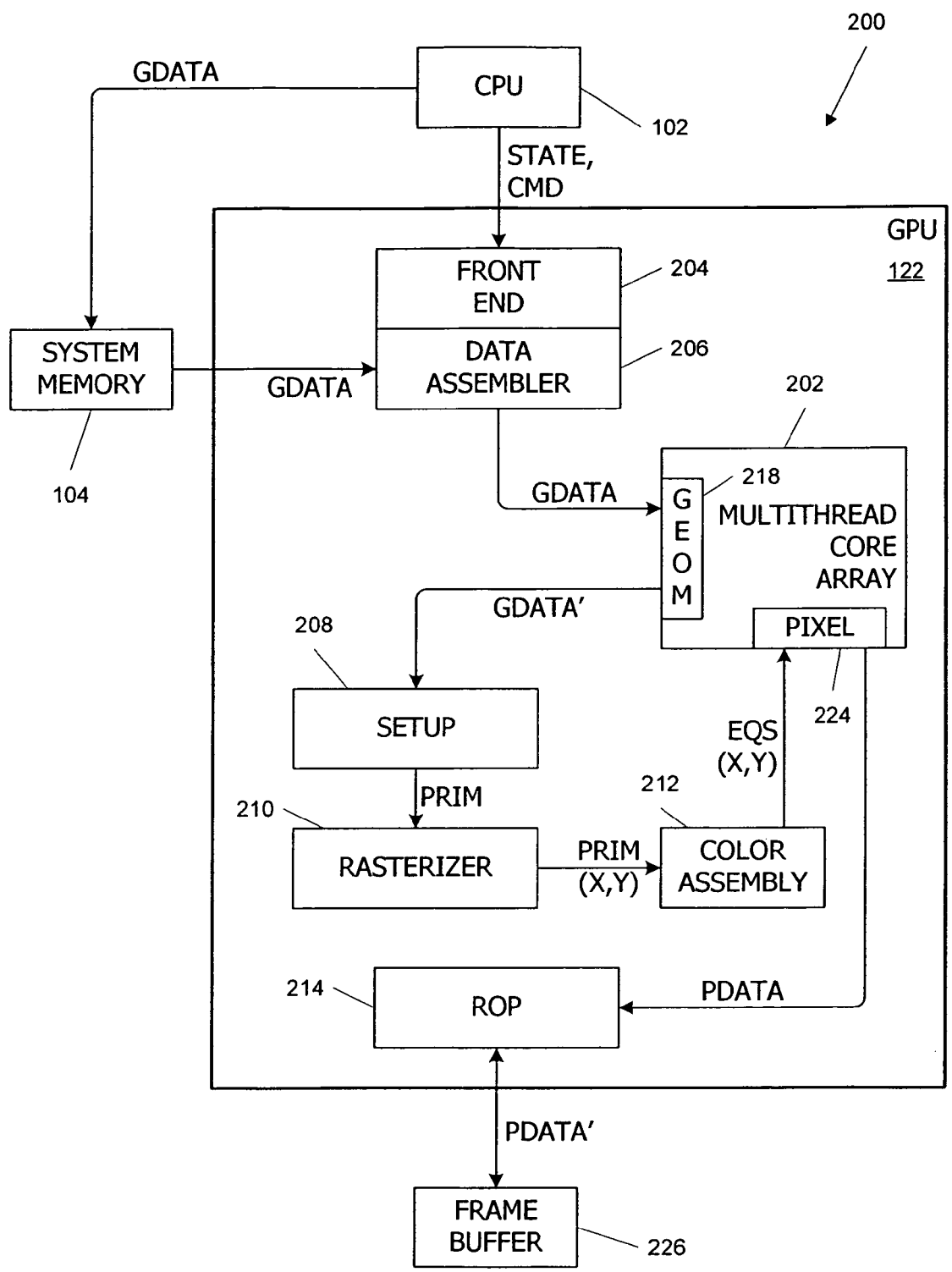
FIG. 2 is a block diagram of a rendering pipeline that can be implemented in a GPU according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GEOM') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B, and C for a plane equation of the form U=Ax+By+C for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
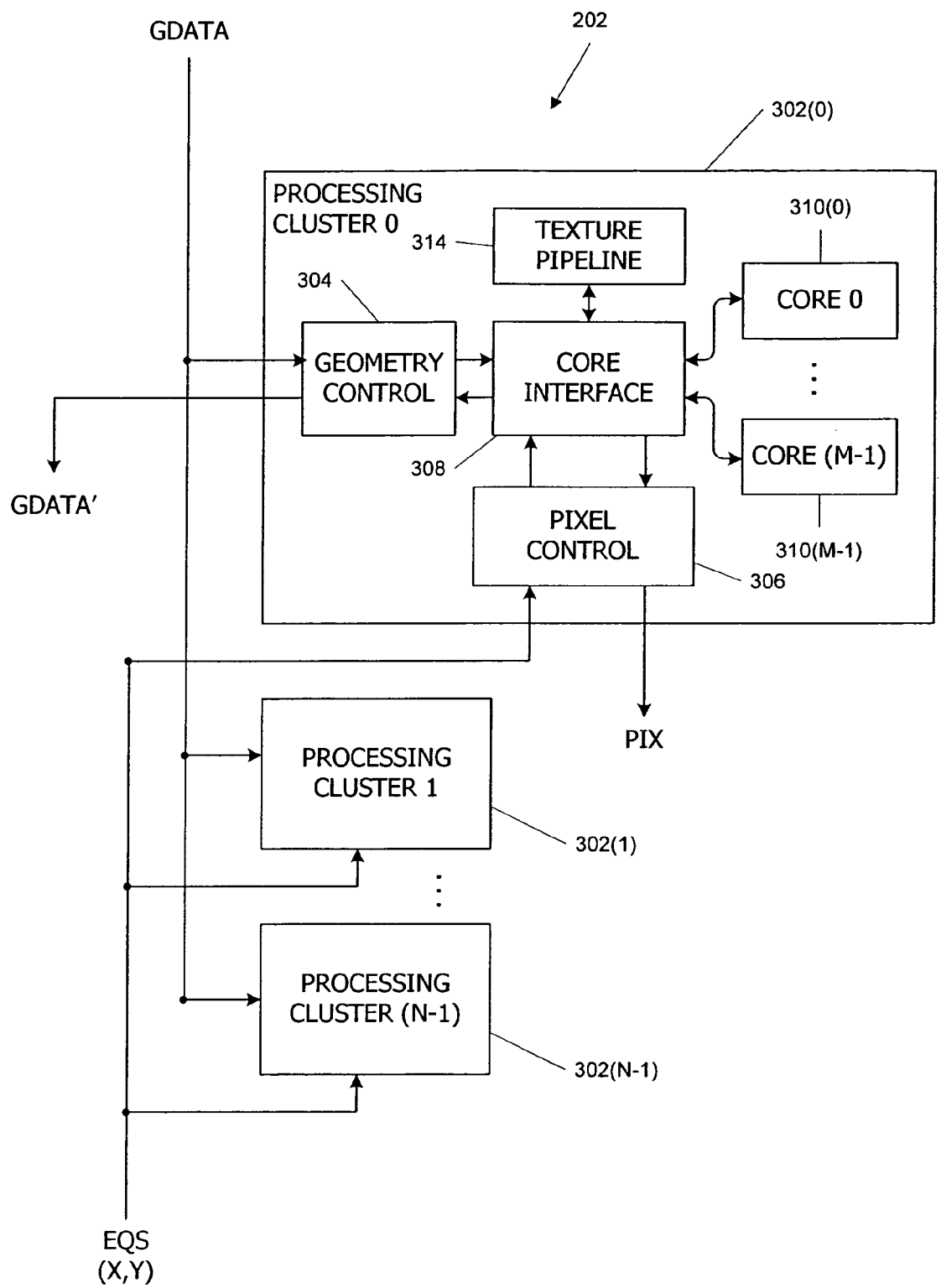
FIG. 3 is a block diagram of a multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GEOM') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
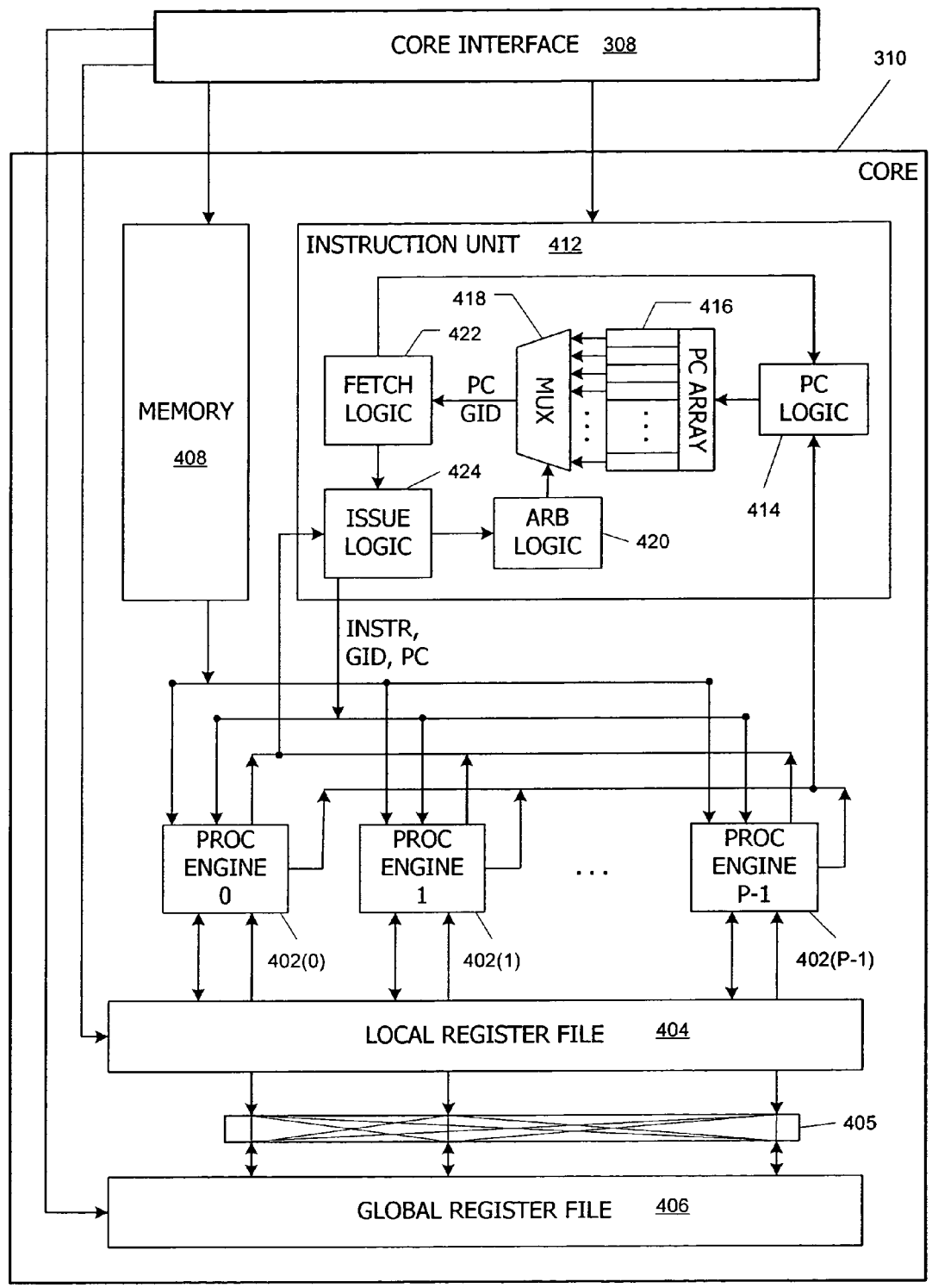
FIG. 4 is a block diagram of a processing core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a global register file 406 that is shared among all of the processing engines 402 in core 310. Global register file 406 may be as large as desired, and in some embodiments, any processing engine 402 can read to or write from any location in global register file 406. In addition to global register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multi-threaded and can execute up to some number G (e.g., 24) of threads concurrently, e.g., by maintaining current state information associated with each thread in a different portion of its allocated lane in local register file 406. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multi-threaded, supporting up to G threads, core 310 in this embodiment can have up to P*G threads in flight concurrently. For instance, if P=16 and G=24, then core 310 supports up to 384 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group.

Instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on whether the PC value corresponds to the next instruction in its thread associated with group index GID.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space for an input buffer (e.g., in global register file 406 or local register file 404) for each processing engine 402 to execute one vertex thread, then loads the vertex data. In one embodiment, all data for the first vertex in the group is loaded into a lane of the input buffer allocated to processing engine 402(0), all data for the second vertex is in a lane of the input buffer allocated to processing engine 402(1), and so on. In some embodiments, data for multiple vertices in the group can be loaded in parallel, as described below.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion. Examples of loading and launching logic for various types of threads are described below.

It should be noted that although all threads within a group are executing the same program and are initially synchronized with each other, the execution paths of different threads in the group might diverge during the course of program execution. Instruction unit 412 advantageously manages instruction fetch and issue for each SIMD group so as to ensure that threads in a group that have diverged eventually resynchronize. For instance, in one embodiment, instruction unit 412 maintains a branch token stack for each SIMD group. If a branch is taken by some threads in a SIMD group ("taken threads") but not by others ("not-taken threads"), a token is pushed onto the SIMD group's branch token stack. The token includes a mask identifying the not-taken threads. Instruction unit 412 continues to fetch instructions for the taken threads; these instructions are issued to all processing engines 402 with an active mask set such that the instructions are executed for the taken threads but not for the not-taken threads. Execution of the taken threads continues until a point in the instruction stream at which the branch-taken path and the branch-not-taken path merge. The merge point can be identified, e.g., by a flag or other indicator associated with the instruction where the merge occurs.

Once the merge point is reached, instruction unit 412 pops the token off the branch token stack and begins fetching instructions for the not-taken threads; these instructions are issued to all processing engines 402 with the active mask set such that the instructions are executed for not-taken threads but not for taken threads. Execution of the not-taken threads continues until the merge point is reached. Thereafter, the taken and not-taken active masks are merged into a single active mask, and fetching and executing continues.

It will be appreciated that the streaming multiprocessor architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 310 is operated at a higher clock rate than core interface 308, allowing the streaming processor to process more data using less hardware in a given amount of time. For instance, core 310 can be operated at a clock rate that is twice the clock rate of core interface 308. If core 310 includes P processing engines 402 producing data at twice the core interface clock rate, then core 310 can produce 2*P results per core interface clock. Provided there is sufficient space in local register file 404, from the perspective of core interface 308, the situation is effectively identical to a core with 2*P processing units. Thus, P-way SIMD parallelism could be produced either by including P processing units in core 310 and operating core 310 at the same clock rate as core interface 308 or by including P/2 processing units in core 310 and operating core 310 at twice the clock rate of core interface 308. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Core Interface

In accordance with an embodiment of the present invention, core interface 308 manages the creation (loading and launching) of SIMD groups. As described above, during rendering operations, a SIMD group may execute a vertex shader (VS) program, a geometry shader (GS) program, or a pixel shader (PS) program. While all threads of a SIMD group execute the same program, different SIMD groups executing different types of shader programs may be executed concurrently. Core interface 308 is advantageously designed to efficiently load and launch SIMD groups of any type in any sequence and can load and launch a new SIMD group whenever sufficient resources for executing the group are available in one of the cores 310 managed by core interface 308.

Figure 5:
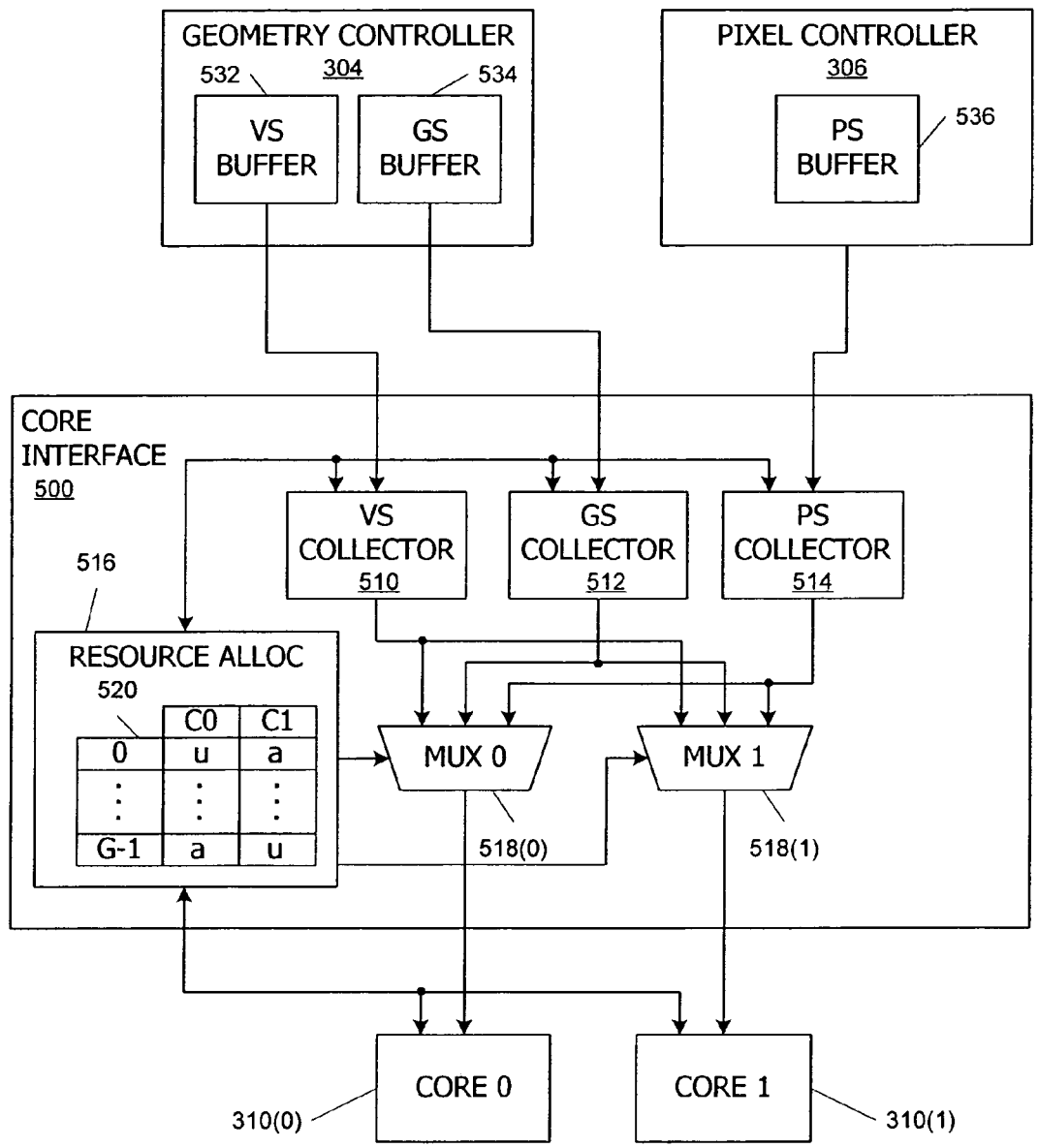
FIG. 5 is a block diagram of a core interface according to an embodiment of the present invention.

FIG. 5 is a block diagram of a core interface 500 implementing core interface 308 of FIG. 3 according to an embodiment of the present invention. Core interface 500 communicates with two cores 310(0) and 310(1) and also communicates with geometry controller 304 and pixel controller 306. It is to be understood that, while only two cores 310 are shown, core interface 500 could be modified to communicate with any number of cores.

Core interface 500 includes a vertex shader (VS) collector 510, a geometry shader (GS) collector 512, and a pixel shader (PS) collector 514. VS collector 510 receives vertex data from a VS buffer 532 in geometry controller 304. GS collector 512 receives geometry data from a GS buffer 534 in geometry controller 304. PS collector 514 receives pixel data from a PS buffer 536 in pixel controller 306. VS buffer 532, GS buffer 534 and PS buffer 536 may be implemented as FIFO (first-in, first-out) buffers of generally conventional design. Each collector assembles the input data for up to P threads of the corresponding type, then launches a SIMD group to process the assembled data.

Operation of VS collector 510, GS collector 512 and PS collector 514 is described below. In general, each collector provides input data for a SIMD group to two steering multiplexers (muxes) 518(0) and 518(1) that direct the data to the one of cores 310 that has been chosen execute the SIMD group.

A resource allocation unit 516 manages the available resources in both cores 310, including selection of a core 310 to execute each new SIMD group. Resource allocation unit 516 is advantageously configured to track resource usage, including which group index values (GID) are in use or free in PC array 416 (FIG. 4) and which entries in local register file 404 and/or global register file 406 are in use or free. In one embodiment, resource allocation unit 516 includes a GID table 520 that tracks, for each core (C0 and C1), which group index values GID (0 through G−1) are in use ("u") or available ("a"). Resource allocation unit 516 also includes an additional table (not explicitly shown) for managing the local register file 404 and global register file 406 in each core 310. Via this table, which can be implemented using conventional techniques, resource allocation unit 516 determines whether sufficient register file space for a new SIMD group is available and allocates space to each new SIMD group at the beginning of its creation. In some embodiments, the allocations are made at the outset of the loading process so that creation of a SIMD group is begun only when sufficient resources are available to complete the creation and execute the group.

When either of cores 310 completes execution of a SIMD group, that core 310 signals completion to resource allocation unit 516, which updates its tables (e.g., table 520) to indicate that all resources associated with the completed SIMD group are available for reallocation to a new group.

In some embodiments, collectors 510, 512, 514 are configured to send a resource request to resource allocation unit 516 when they begin to receive input data for a new SIMD group and to wait for a response from resource allocation unit 516 before proceeding further. Resource allocation unit 516 selects one of cores 310, allocates a group identifier GID within that core, and also a sufficiently large space in the local register file 404 and/or global register file 406 of the selected core, where "sufficient" is determined based in part on the thread type of the collector making the request. Resource allocation unit 516 also controls steering muxes 518 to steer input data provided by collectors 510, 512, 514 to one or the other of cores 310.

In one embodiment, if sufficient resources are not available when resource allocation unit 516 receives a request (e.g., if no group identifiers are available in either core 310 or if neither core 310 has sufficient space in its local register file 404 or global register file 406), resource allocation unit 516 delays its response to the request until sufficient resources become available. In the meantime, the requesting collector holds up its input data stream until the request is serviced, exerting backpressure on the pipeline. Data may accumulate in VS buffer 532, GS buffer 534 and PS buffer 536 or elsewhere upstream during this period. (As described above, in some embodiments with multiple processing clusters, data is not sent into a particular cluster unless it is known that the cluster has sufficient resources available to process the data.)

In one embodiment, up to two of the three collectors 510, 512, 514 can be active at the same time, with each collector feeding a different one of the two cores 310. In another embodiment, only one of the three collectors 510, 512, 514 is active at a given time. Resource allocation unit 516, which communicates with all three collectors, is advantageously configured to delay responding to requests from other collectors if the maximum number of collectors are active. In still other embodiments, it is possible to write multiple data streams in parallel into local register file 404 or global register file 406 of one core 310, and limiting the number of simultaneously active collectors is not required.

Figure 6:
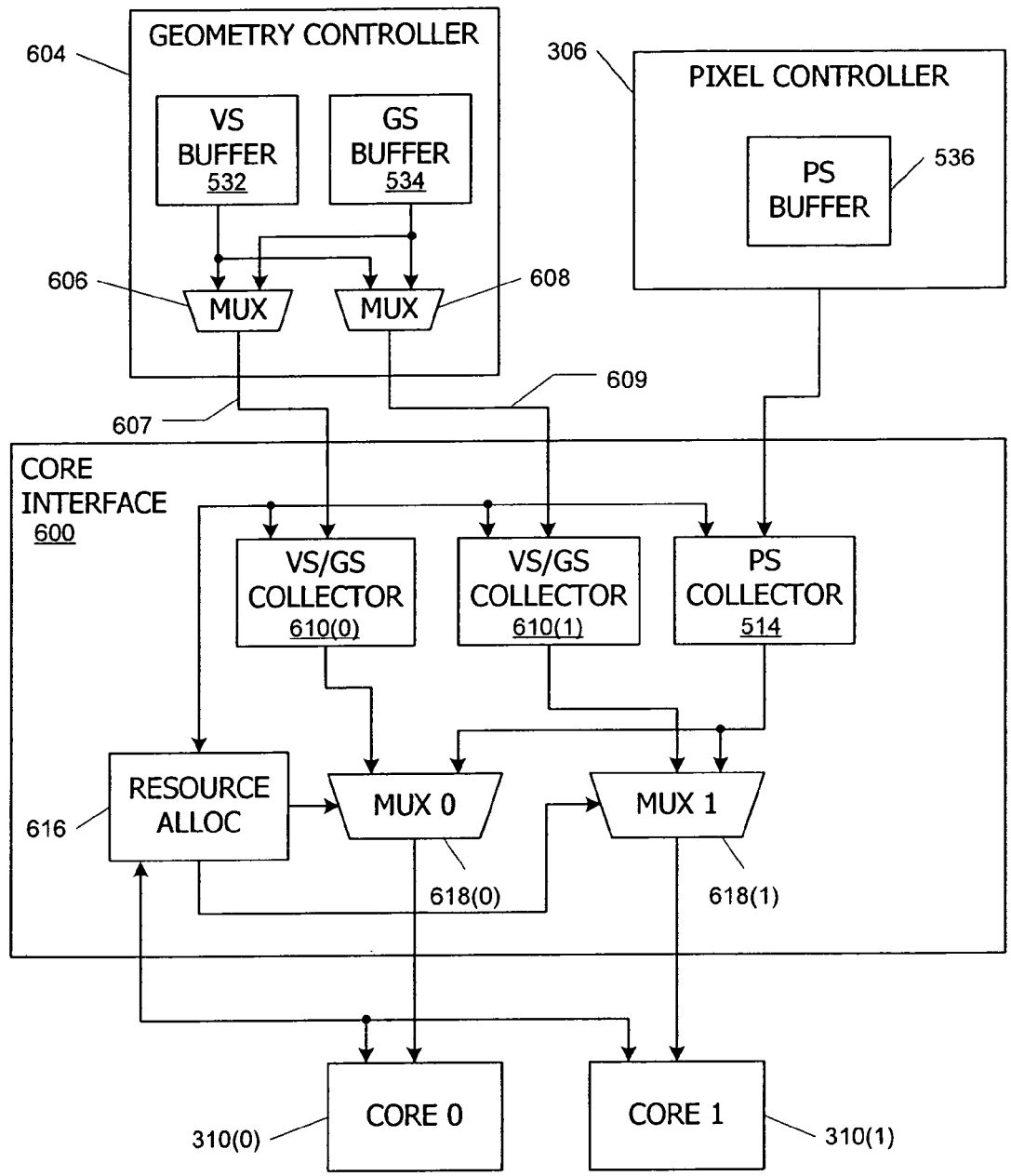
FIG. 6 is a block diagram of a core interface according to an alternative embodiment of the present invention.

FIG. 6 is a block diagram of a core interface 600 according to an alternative embodiment of the present invention. Core interface 600 is generally similar to core interface 500, except that in this embodiment, the decision as to which core is used for VS and GS SIMD groups is made in geometry controller 604. VS buffer 532 and GS buffer 534 deliver data to a pair of steering muxes 606, 608. Steering logic (not shown) in geometry controller 604 operates steering muxes 606, 608 to direct data along one of two paths 607, 609 into core interface 600. Path 607 carries the data to a first VS/GS collector 610(0), which delivers data only to core 310(0) via steering mux 618(0). Similarly, path 609 carries the data to a second VS/GS collector 610(1), which delivers data only to core 310(1) via steering mux 618(1). When one of VS/GS collectors 610 is active, resource allocation circuit 616 activates the corresponding one of steering muxes 618 to complete data delivery to the core.

In this embodiment, geometry controller 604 determines which core 310 will process particular vertex data. This configuration is useful, e.g., where geometry controller 604 manages a "geometry buffer" in the global register file of core 310 that stores vertex data to be consumed by geometry shader threads. As described below, geometry controller 604 can direct execution of geometry shader threads for particular primitives to a core 310 whose geometry buffer has the vertex data for that primitive.

It will be appreciated that the core interface described herein is illustrative and that variations and modifications are possible. As noted above, a single core interface can support any number of cores; the core interface can also support more thread types, fewer thread types or a different combination of thread types from those shown. For example, a core interface might also be configured to manage loading and launching of general-purpose computation threads in SIMD groups. Core selection for any thread type can be managed by the core interface or an upstream controller.

Vertex Thread Loading

While VS collector 510 and PS collector 514 each collect input data to populate a SIMD group of threads, the nature of the input data for pixel and vertex threads is sufficiently different that each collector is advantageously implemented somewhat differently. In particular, VS programs generally process a relatively large number of attributes per vertex, including 3-D object coordinates, color values, transparency values, surface normals, texture coordinates (often for multiple texture maps), and so on. Thus, VS collector 510 is advantageously designed for efficient loading of a relatively large amount of per-thread input data. As described below, PS programs generally require considerably less per-thread input data and more shared data, and PS collector 514 is advantageously configured to load shared input data in addition to a smaller amount of per-thread input data.

Figure 7:
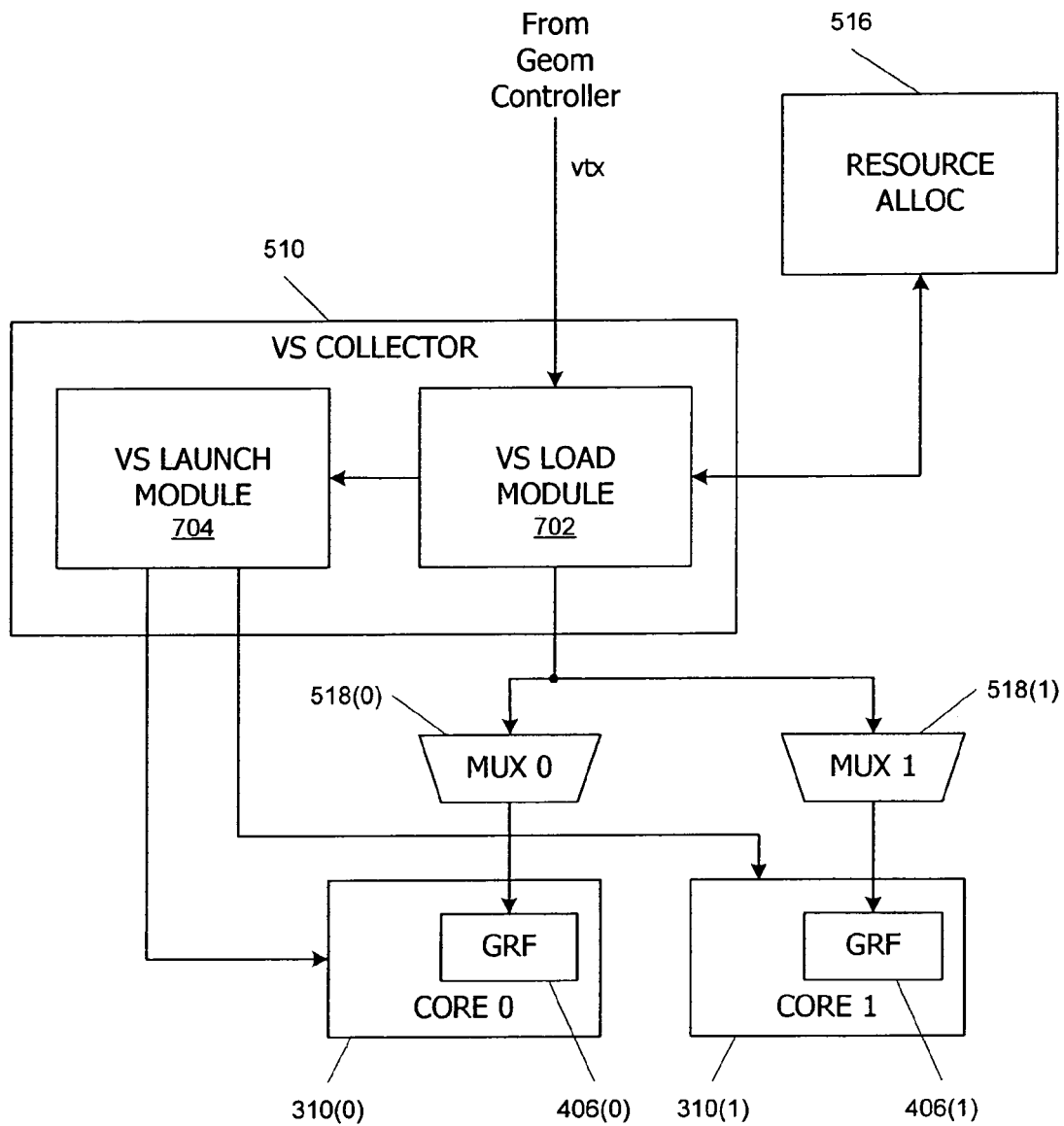
FIG. 7 is a block diagram of a collector for vertex shader threads according to an embodiment of the present invention.

FIG. 7 is a block diagram of VS collector 510 according to an embodiment of the present invention. VS collector 510 includes a VS load module 702 and a VS launch module 704. VS load module 702 receives vertex data from geometry controller 304 and stores it in an input buffer, which may be implemented in the global register file (GRF) 406 in one of cores 310 as described below, via muxes 518. VS load module 702 communicates with resource allocation unit 516 to determine where within the global register file incoming data is to be stored. In one embodiment, VS load module 702 provides little or no internal buffering; global register file 406 is used as the collection buffer for the input data to be processed. If space in global register file 406 is not immediately available, VS load module 702 can refuse to accept further input data, exerting backpressure up the pipeline.

VS load module continues to receive and load vertex data into global register file 406 until enough data for a SIMD group has been loaded. Once loading is complete, VS load module 702 sends a "full" signal to VS launch module 704. VS launch module 704 detects the full signal and alerts core 310 that execution of the new SIMD group can begin. Core 310 responds by beginning to fetch and execute instructions for the new group (concurrently with any existing groups) as described above. Operation of VS launch module 704 is described further below.

Figure 8A:
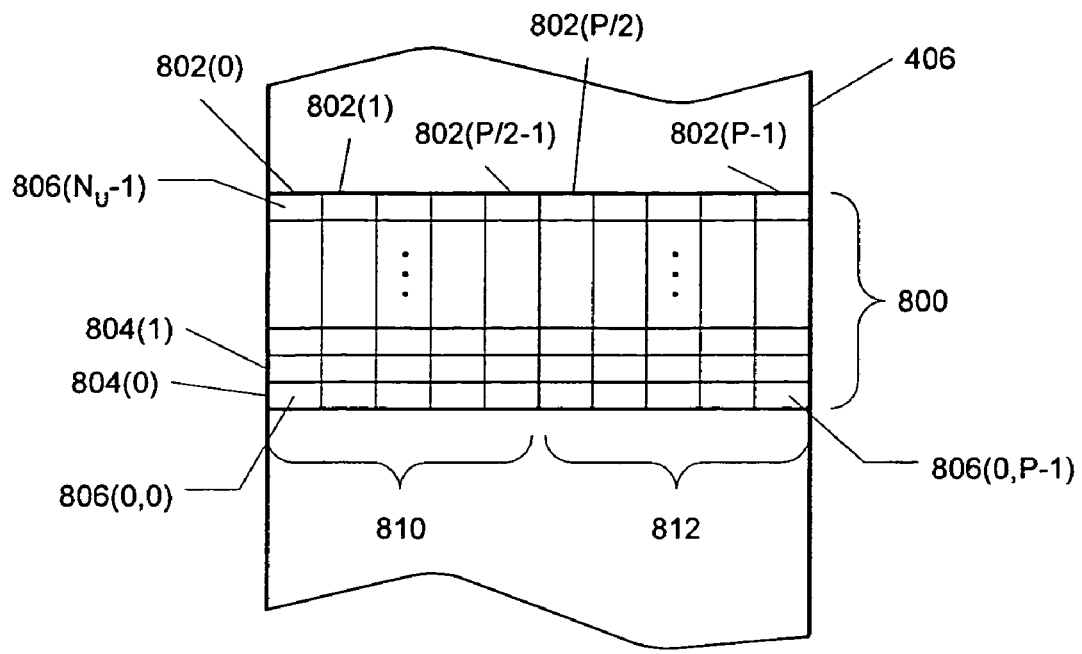
FIG. 8A illustrates an organization of a local register file in a processor core according to an embodiment of the present invention.

The implementation of VS load module 702 depends in part on the structure of the input buffer. In one embodiment, as shown in FIG. 8A, an input buffer 800 is a region allocated in global register file 406. Input buffer 800 is segmented into P lanes 802 (oriented vertically on the page for purposes of illustration) and into rows 804 (oriented horizontally on the page for purposes of illustration), forming an array of entries 806, each of which holds one data word (e.g., 32 bits). Entries 806 in the same row 804 store values of the same attribute (e.g., entries 806(0,0) through 806(0,P−1) might store the x coordinate) for different vertices, and all the attributes for one vertex are stored in the same lane 802. During execution of a SIMD group, each processing engine processes the vertex data from one of the lanes 402.

Figure 8B:
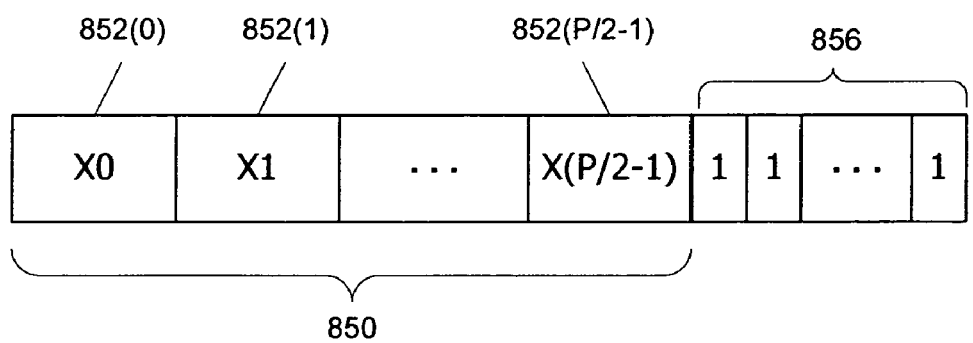
FIG. 8B illustrates a vertex data block as delivered to a vertex shader load module according to an embodiment of the present invention.

The implementation of VS load module 702 also depends in part on the format of the incoming vertex data. FIG. 8B illustrates a vertex data block 850 as delivered to VS load module 702 by geometry controller 304 according to an embodiment of the present invention. In this embodiment, each vertex data block includes P/2 data words 852, each of which represents the value of the same attribute (e.g., the x coordinate) for a different one of a group of P/2 vertices. Successive data blocks provide values for different attributes (e.g., the y coordinate, z coordinate, and so on) of the same P/2 vertices, until all attributes of one group of P/2 vertices have been delivered. In this manner, VS load module 702 receives data for P/2 vertices in parallel.

In some instances, fewer than P/2 vertices might be delivered in parallel. Accordingly, data block 850 advantageously has an associated "valid" mask 856 having P/2 bits. Each bit is set to logic high (e.g., value 1) or logic low (e.g., value 0) to indicate whether the corresponding data word 852 contains valid data. In one embodiment, data can be stored in input buffer 800 regardless of the state of valid bits in mask 856; in another embodiment, any words masked as invalid are not stored in input buffer 800. In either case, the valid mask is advantageously used during processing to determine whether results should be kept or ignored.

It is to be understood that vertex data can be provided to GPU 122 (see FIG. 2) in any format and that GPU 122 can be configured to reformat vertex data prior to delivering it to VS load module 702. In one embodiment, CPU 102 provides a serial stream of single vertices to GPU 122; each attribute may be delivered separately, or multiple attributes may be packed together for parallel as desired. Data assembler 206 advantageously includes a buffer that can be used to collect and reorganize incoming vertex data into blocks 850 for delivery to geometry controller 304.

Figure 9:
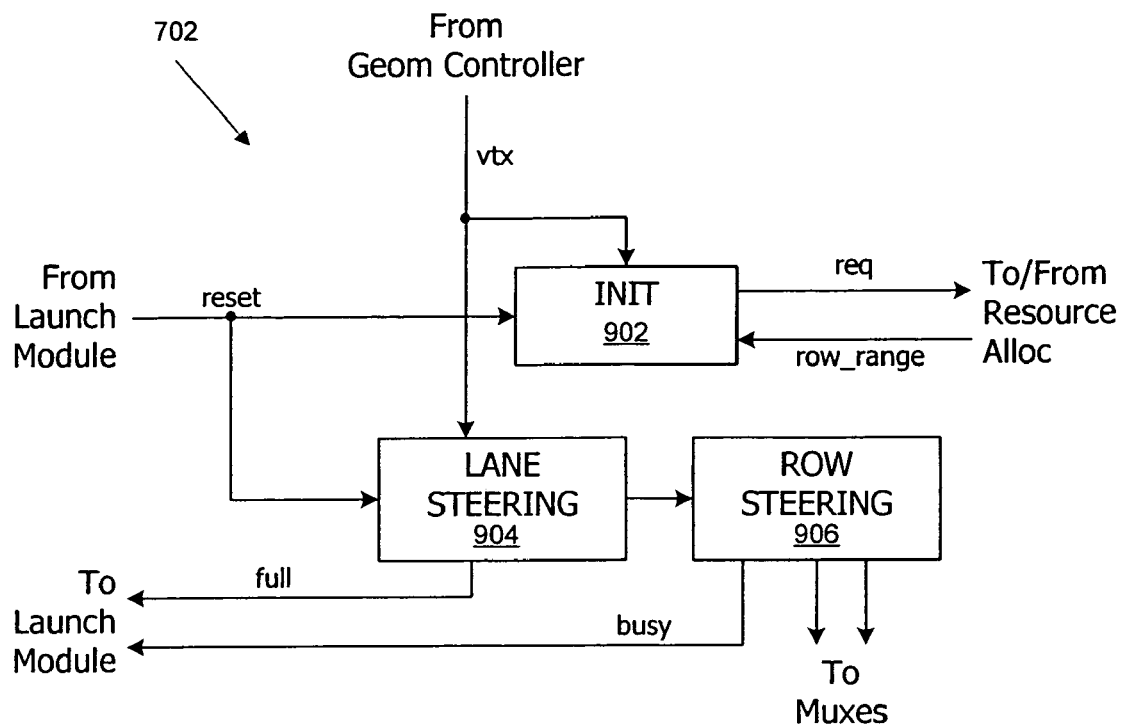
FIG. 9 is a block diagram of a vertex shader load module according to an embodiment of the present invention.

FIG. 9 is a block diagram of VS load module 702 according to an embodiment of the present invention. VS load module 702 is adapted to load vertex data blocks 850 (FIG. 8B) into an input buffer 800 that is organized as shown in FIG. 8A; input buffer 800 may be allocated in global register file 406 as described above. VS load module 702 includes an initialization (INIT) unit 902 that communicates with resource allocation unit 516, a lane steering unit 904, and a row steering unit 906.

Initially, VS load module 702 is in a reset state and has not loaded any vertex data. Vertex data is delivered in blocks 850 (se FIG. 8B) by geometry controller 304. Initialization unit 902 detects the first block of vertex data and issues a request (req) to resource allocation module 516, requesting resources for a SIMD group that will execute VS threads.

Resource allocation unit 516 responds to the request by allocating space in global register file 406. More specifically, resource allocation unit 516 allocates a region in global register file 406 for use as an input buffer 800 (see FIG. 8A) that includes a number of rows 804. The number of rows 804 allocated to input buffer 800 is advantageously at least equal to the number of attributes per vertex. Resource allocation unit 516 provides row steering unit 906 of VS loader 502 with a reference (row_range) that identifies the region to be used. Resource allocation unit 516 also assigns a group index GID in one of the cores 310 to the new SIMD group and provides the index to VS launch module 704.

While the request is being made, lane steering unit 904 reformats the first block of vertex data for delivery to input buffer 800. Various reformatting operations can be used, depending on the order of delivery of vertex data and the organization of the input buffer. In one embodiment, input buffer 800 is logically divided into a left half 810 and a right half 812, as indicated in FIG. 8A. Lane steering unit 904 and row steering unit 906 deliver the P/2 vertex words to the appropriate row 804 in either the left half 810 or right half 812 of input buffer 800.

Figure 10:
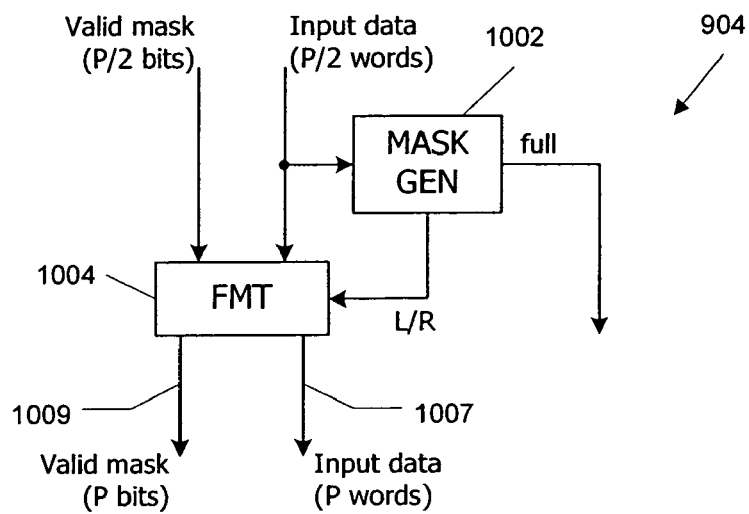
FIG. 10 is a block diagram of a local register file lane steering unit according to an embodiment of the present invention.

FIG. 10B is a block diagram of lane steering unit 904 according to an embodiment of the present invention. A mask generator 1002 determines when all attributes for a group of vertices have been received. In one embodiment, the data block containing the last attribute value for a group of vertices is flagged as the last, and mask generator 1002 detects this flag. In another embodiment, mask generator 1002 keeps a running count of the number of data words that have been received and compares the count to the total number of attributes expected per vertex. The total number of attributes is advantageously provided as state information for the vertex shader program; conventional techniques for communicating and updating state information can be used.

Mask generator 1002 generates a control signal (L/R) that selects between left half 810 and right half 812 of input buffer 800. More specifically, the L/R control signal operates a formatting (FMT) unit 1004 that steers the data onto the left half or right half of a data path 1007 that is P words wide. In one embodiment, mask generator 1002 is configured such that, starting with the first block 850 of vertex data, the left half is selected until the last set of attribute values is received; thereafter, the right half is selected until the last set of attribute values is again received. At that point, P vertices have been loaded, enough to fully populate a SIMD group. Mask generator 1002 asserts the "full" signal, and steering of data is halted until a reset signal is received from VS launch module 704, indicating that the SIMD group has been launched. The reset signal from VS launch module 704 resets the attribute count to zero and resets the L/R control signal to again start selecting left half 810 of input buffer 800.

Formatting unit 1004 also receives P/2-bit valid mask 856 and generates a P-bit valid mask on a data path 1009 based on the L/R control signal. If the L/R control signal selects the left half (right half), then the leftmost (rightmost) P/2 bits are determined by P/2 bit valid mask 856 and the rightmost (leftmost) P/2 bits are set to the invalid (logic low) state. The input logic for global register file 406 is advantageously configured such that an entry 806 in input buffer 800 is not overwritten if the incoming data for that entry is invalid; thus, data words containing valid data only in the right half do not overwrite data words in the left half (or vice versa).

Referring again to FIG. 9, row steering unit 906 delivers the reformatted data to muxes 518. In one embodiment, row steering unit 906 attaches row-identifying information to the data so that the data is written into the desired row 804 in input buffer 800. Row steering unit 906 generates a "busy" signal each time valid data passes through; this signal controls a timeout in VS launch module 704 as described below.

In operation, mask generator 1002 of lane steering unit 904 initially selects left half 810 of input buffer 800 of FIG. 8A. Row steering unit 906 (FIG. 9) directs the first block 850 of vertex data to row 804(0), the first row in input buffer 800, where it is stored in left half 810 without affecting any data stored in right half 812. Row steering unit 906 increments the row selection, and the next block 850 is stored in the left half 810 of row 804(1) of input buffer 800, and so on, until the $N_U$th block 850 (where $N_U$ is the number of attributes per vertex) is written to the left half of row 804($N_U$−1). Thereafter, mask generator 1002 begins to select right half 812 of input buffer 800. Row steering unit 906 directs the ($N_U$+1)th block 850 to row 804(0), where it is stored in right half 812 without affecting the data already stored in left half 810. The next block 850 is stored in the right half of row 804(1), and so on until $N_U$ attributes have also been stored in right half 812. At that point, loading is complete, and mask generator 1002 asserts the "full" signal.

It will be appreciated that the VS load module described herein is illustrative and that variations and modifications are possible. The input buffer may be implemented in the global register file, in local register files, or in other local memory associated with individual processing engines as desired.

Many techniques for loading input data may be used, and the arrangement of vertex data blocks is a matter of design choice. For instance, multiple attributes for one vertex at a time could be loaded in parallel. In another embodiment, attributes for all P vertices of a SIMD group are loaded in parallel. In general, an optimum loading procedure depends in part on the width of the input data path and the structure and input logic implemented for the input buffer.

VS Thread Launch

Thread launching for SIMD groups executing VS threads will now be described. "Launching," as used herein, refers to initiating execution of a SIMD group by core 310. Launching may also include related activities such as loading any state information needed for correct execution of the program into core 310. In one embodiment, VS launch module 704 manages these operations.

As noted above, a SIMD group is advantageously launched as soon as input data for all threads of the group has been loaded into the local register file. In some embodiments, it is also desirable to allow groups to be launched under other conditions. For instance, in the embodiment described above, vertex data might stop arriving when only left half 810 of input buffer 800 has been loaded. To avoid undue delay in execution of the first P/2 threads, the control logic for launching VS threads may include a timeout detector to control launching of partially populated SIMD groups.

Figure 11:
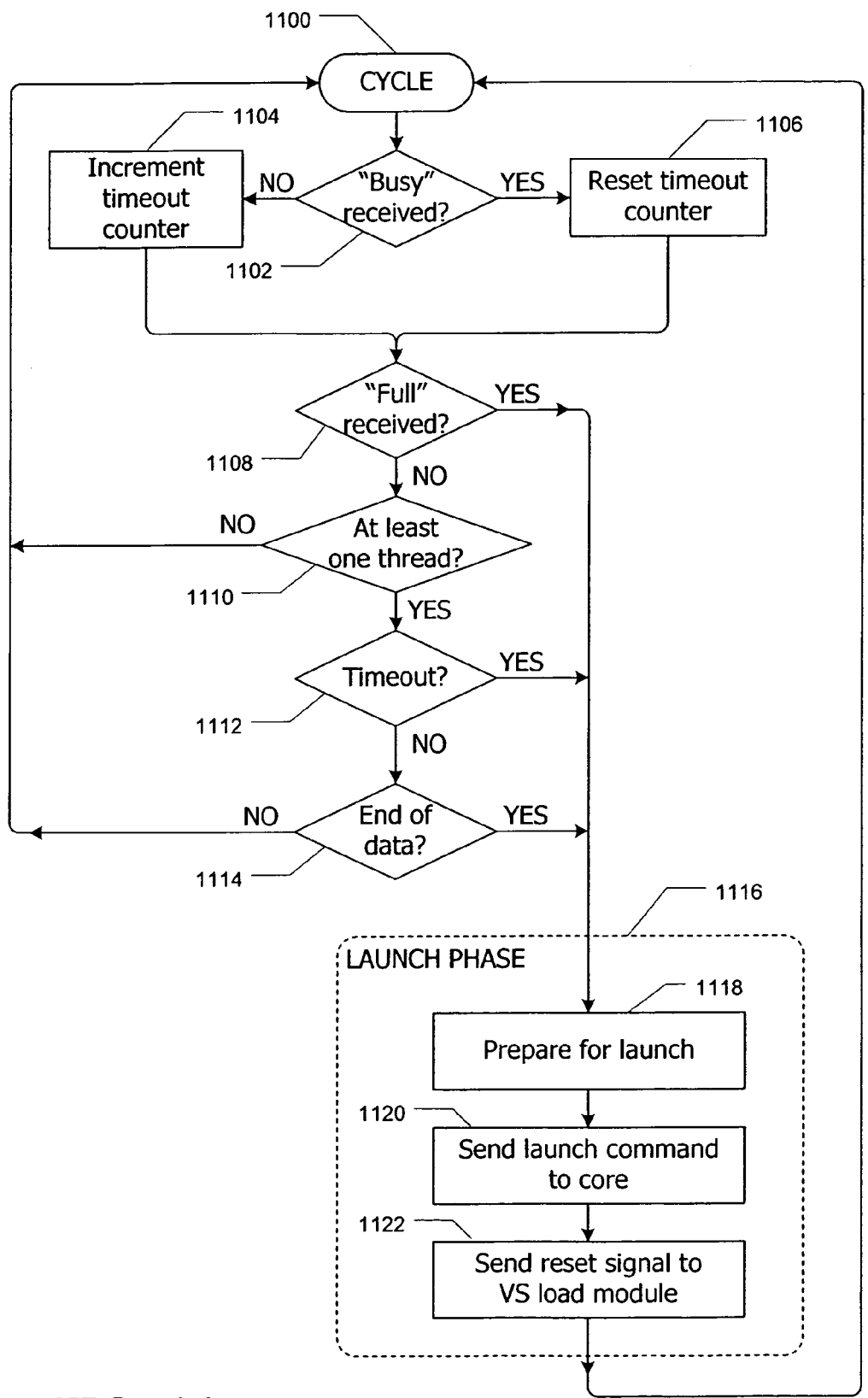
FIG. 11 is a flow diagram of control logic for launching vertex thread groups according to an embodiment of the present invention.

FIG. 11 is a flow diagram of control logic implemented in VS launch module 704 according to an embodiment of the present invention. The steps shown herein are repeated on each processor cycle 1100. Briefly, VS launch module 704 first determines if any launch criteria are satisfied and, if so, moves into a launch phase 1116 in which the SIMD group is launched and VS load module 702 is reset so that it can begin loading data for the next SIMD group.

More specifically, at step 1102, VS launch module 704 detects the "busy" signal from row steering unit 906 of VS load module 702 (see FIG. 9). Assertion of the busy signal indicates that VS load module 702 is receiving and steering vertex data into input buffer 800; deassertion of the busy signal indicates that VS load module 702 is idle, i.e., that vertex data is not coming in. If the busy signal is not asserted, a timeout counter is incremented (step 1104); if the busy signal is asserted, the timeout counter is reset (step 1106).

In either case, at step 1108, VS launch module 704 determines whether the "full" signal has been asserted by lane steering unit 904 of VS load module 702. If so, then VS launch module 704 enters the launch phase 1116.

If the full signal has not been asserted, then at step 1110, VS launch module 704 determines whether at least one thread is waiting to be launched. In the embodiment of VS load module 702 described above, this would be the case if all of the vertex data for the first P/2 threads has been loaded. If no threads are waiting, there is no reason to launch, and VS launch module 704 waits for the next cycle 1100.

If at least one thread is waiting, then at step 1112, VS launch module 704 determines whether a timeout has occurred. In one embodiment, VS launch module compares the value of the timeout counter to a threshold value, which may be a configurable parameter corresponding, e.g., to 5, 10 or some other number of cycles. If the counter exceeds the threshold value, a timeout occurs and VS launch module 704 enters the launch phase 1116.

If no timeout occurs, then at step 1114, VS launch module 704 determines whether an "end of data" signal has been received. As used here, an "end of data" signal appears in the vertex data stream at any point at which it is desirable to launch all SIMD groups for vertices prior to that point, even if the groups are not fully populated. For example, an end of data signal might appear following the last vertex in a scene to be rendered. An end of data signal might also appear in other circumstances where it is desirable to have a SIMD group launched even if the group is less than fully populated. For instance, in some embodiments, all threads in a SIMD group share the same state information, and an "end of data" signal might be inserted into the vertex stream when state information changes so that vertices having different state parameters are processed in different SIMD groups. End of data signals can be detected by VS load module 702 and forwarded to VS launch module 704 after the last vertex data preceding the end of data signal has been loaded into input buffer 800.

At step 1114, if an end of data signal has been received, VS launch module 704 enters the launch phase 1116; if not, VS launch module 704 waits for the next cycle 1100.

If any of the launch conditions described above are met, the launch phase 1116 is entered. Launch phase 1116 includes various steps associated with preparing core 310 to execute the new SIMD group. More specifically, at step 1118, VS launch module 704 performs final preparations for launch. These preparations may include, e.g., establishing a group index GID for the new SIMD group, allocating scratch space in local register file 404 that can be used by processing engines 402 to store intermediate results generated during execution of the new SIMD group, forwarding current state information related to vertex processing to core 310, and so on. In some embodiments, some or all of these preparations may be performed when vertex data is received, as described above.

At step 1120, VS launch module 704 sends a launch command to core 310. The launch command identifies the group index GID of the new SIMD group and also includes references (e.g., pointers) to the input buffer 800 and to the scratch space in local register file 404. The launch command also indicates that the new SIMD group has vertex threads. The launch command may also include an active mask indicating which threads have valid input data. In response to the launch command, core 310 begins fetching and executing instructions for the new SIMD group of vertex threads. More generally, a launch command may include any information that enables core 310 to begin executing the new SIMD group, and some or all of this information may be pre-loaded into core 310 prior to sending the launch command. Thus, any action sufficient to notify core 310 that the new SIMD group is ready for execution may be performed at step 1120 in addition to or instead of sending the launch command described herein.

At step 1122, VS launch module 704 sends a reset signal to VS load module 702; the reset signal resets VS load module 702 so that it can begin loading a new SIMD group whenever the next block of vertex data arrives.

It will be appreciated that the launch control logic described herein is illustrative and that variations and modifications are possible. Logic steps (including the various tests) described as sequential may be executed in parallel, order of steps may be varied, and steps may be modified or combined. Other launch conditions may also be supported as desired. In addition, if launch occurs when only some of the attributes for a vertex have been loaded (e.g., due to a timeout), vertices with an incomplete set of attributes are advantageously marked invalid, and the VS collector (see FIG. 7) may be configured to signal an exception.

GS Thread Loading and Launch

In some embodiments of the present invention, the input to each geometry shader (GS) thread is a primitive, represented as an ordered list of vertices with their various attributes. Vertex data that has already been processed by a vertex shader program is advantageously used. As is known in the art, one vertex may be included in multiple primitives; accordingly, it is desirable to provide a pool of vertices that can be accessed by multiple GS threads. Thus, GS collector 512 is advantageously designed to manage a vertex pool (also referred to herein as a geometry buffer) and to provide pointers to locations in the vertex pool as the input data for each GS thread.

In some embodiments, geometry shader programs are run in only one of cores 310 in each processing cluster 302, regardless of the number of cores 310 per cluster 302. Such an embodiment is described herein; those skilled in the art will recognize that with suitable modifications to the control logic described herein, geometry shader programs can be run in every core 310.

Figure 12:
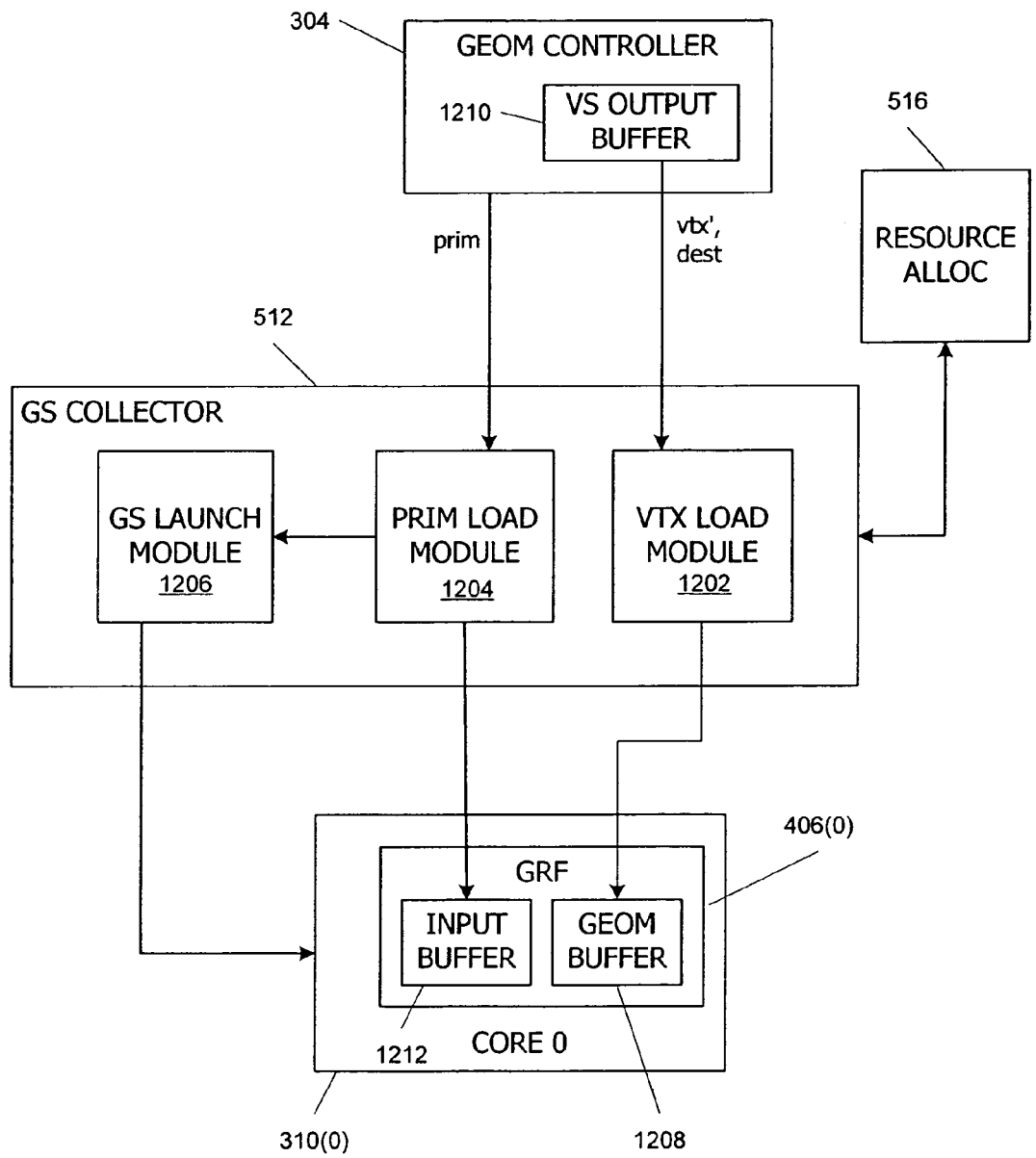
FIG. 12 is a block diagram of a collector for geometry shader threads according to an embodiment of the present invention.

FIG. 12 is a block diagram of GS collector 512 according to an embodiment of the present invention. GS collector 512 includes a vertex load module 1202, a primitive load module 1204, and a GS launch module 1206. Vertex load module 1202 receives vertex data from geometry controller 304 and stores it in a geometry buffer 1208 in global register file (GRF) 406 of one of cores 310. Geometry buffer 1208 may be allocated during system startup (or application startup) in any core 310 that is to execute geometry shader threads and may remain allocated, e.g., for the duration of an application.

In one embodiment, the vertex data (vtx') provided to vertex load module 1202 corresponds to output data from vertex shader threads that may be executed in any one of cores 310 in the same processing cluster 302. The vertex shader program in this embodiment includes instructions to core 310 to transfer the processed vertex data (vtx') to a VS output buffer 1210 located in geometry controller 304; the actual transfer may proceed via core interface 308. Geometry controller 304 delivers the vertex data (vtx') from output buffer 1210 to vertex load module 1202, which stores the data in geometry buffer 1208. Geometry controller 304 in this embodiment specifies the location (dest) at which each vertex is to be stored in geometry buffer 1208.

In this embodiment, geometry controller 304 also determines when a vertex stored in geometry buffer 1208 is no longer needed and instructs vertex load module 1202 to remove or overwrite the old vertex data at an appropriate time.

Primitive load module 1204 receives a primitive definition for each geometry shader thread from geometry controller 304 and loads the definitions into a GS input buffer 1212 that may be allocated in global register file 406 (or in local register file 404) in core 310. In one embodiment, primitive load module 1204 communicates with resource allocation unit 516 to determine where within global register file 406 the primitive definitions are to be stored. If space in global register file 406 is not immediately available, primitive load module 1204 can refuse to accept further input data, exerting backpressure up the pipeline.

In one embodiment, each primitive definition (prim) includes an ordered list of pointers to the vertex data in geometry buffer 1210 corresponding to each vertex of the primitive. A primitive definition may also include other information such as the total number of vertices in the primitive and other processing parameters for the geometry shader program as desired. Primitives may be received sequentially or in parallel. Similarly to VS input buffer 800 described above, GS input buffer 1212 may be organized in lanes, with a different primitive stored in each lane. Data defining different primitives may be received in parallel or sequentially.

Similarly to VS load module 702 described above, primitive load module 1204 advantageously includes logic for determining when enough data for a SIMD group has been loaded. Once loading is complete, primitive load module 1204 sends a "full" signal to GS launch module 1206. GS launch module 1206 detects the full signal and alerts core 310 that execution of the new SIMD group can begin. Core 310 responds by beginning to fetch and execute instructions for the new group (concurrently with any existing groups) as described above. Operation of GS launch module 1206 may be generally similar to operation of VS launch module 704 described above, including various launch conditions such as timeouts or end-data events, and a detailed description is omitted.

Each geometry shader thread produces one or more primitives as output. Like vertex shader threads, geometry shader threads may write their output data to a GS output buffer (not explicitly shown) in geometry controller 304. Geometry controller 304 delivers the resulting primitives as processed geometry data (GEOM') from the GS output buffer to setup module 208 shown in FIG. 2.

It will be appreciated that the GS collector described herein is illustrative and that variations and modifications are possible. In some embodiments, some or all of the control logic described as being in geometry controller 304 may instead be present in the GS collector. For instance, the GS collector might maintain a mapping, by vertex identifier, of where different vertices are stored in a geometry buffer in one or more cores. The geometry controller could then define primitives by reference to vertex identifiers, with the GS collector substituting memory references for the vertex identifiers. Further, based on the vertex identifiers and mappings for a particular thread, the GS collector might determine which core 310 should execute a particular geometry shader thread.

Any shared memory in the processing core, including global register file 406 or shared memory 408 of FIG. 4, may be used to implement the geometry buffer. In some alternative embodiments, vertex shader threads write processed vertex data directly into the geometry buffer and report the location where each vertex is stored to the geometry controller or GS collector.

PS Thread Loading

The data requirements for pixel shader (PS) threads are different from those of VS threads. Each PS thread processes one pixel, for which there is relatively little input data as compared with a vertex (which might have dozens of attributes). In one embodiment, the input data for a pixel thread includes the (X, Y) screen coordinates of the pixel, a coverage mask indicating which of several (e.g., 4, 8, 16, etc.) sample locations within the pixel are covered by a primitive, and "centroid" coordinates identifying one or more positions within the pixel at which attribute values are to be computed. The other input data consists of attribute interpolation equations (e.g., attribute coefficients A, B and C as described above) of the primitive, and these equations are generally shared across all pixels covered by a given primitive. While it is possible to load attribute coefficients into the local register file for each thread, this approach can be wasteful of register file space, given the likelihood of a significant amount of duplication.

Another approach is to store a single copy of the attribute equations (e.g., attribute coefficients) as shared data in a location (e.g., shared memory 408 or global register file 406 shown in FIG. 4) that is accessible to all processing engines 402 during execution of the PS threads. In some embodiments, the state information or per-thread data for each SIMD group advantageously includes a reference (e.g., pointer) to the location where the attribute coefficients are stored, and the coefficients are accessed as needed during program execution.

Figure 13:
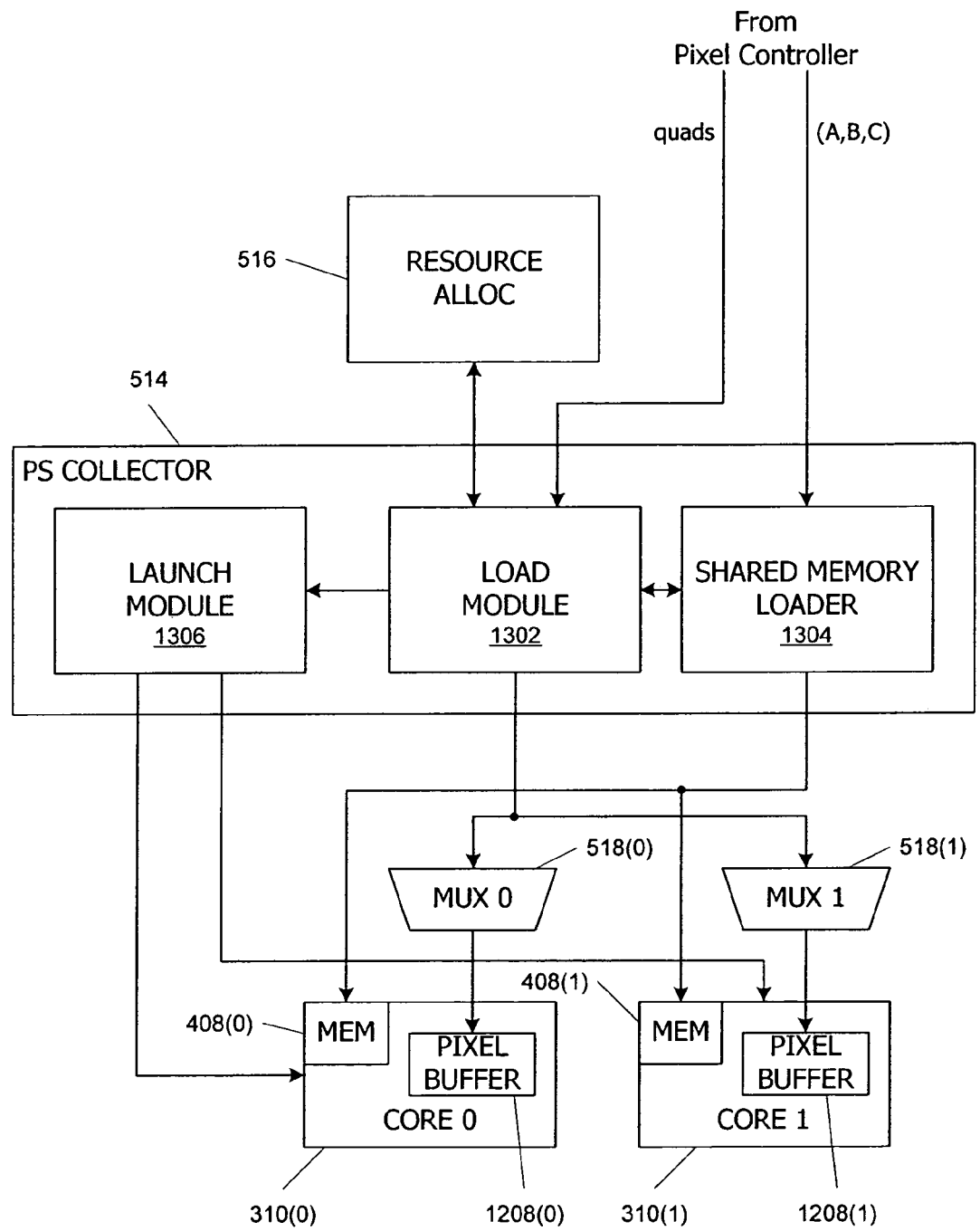
FIG. 13 is a block diagram of a collector for pixel shader threads according to an embodiment of the present invention.

FIG. 13 is a block diagram showing PS collector 514 according to an embodiment of the present invention. PS collector 514 includes a PS load module 1302, a shared memory loader 1304, and a PS launch module 1306. PS load module 1302 communicates with resource allocation unit 516 to obtain an allocation of sufficient resources in one of cores 310 to support execution of a SIMD group of PS threads; in this respect, PS load module 1302 can be generally similar to VS load module 702.

In this embodiment, pixel controller 306 delivers pixel data to PS load module 1302 in "quads," where a quad is a 2×2 array of pixels. Data for one quad may be delivered all at once or over successive cycles, and all data for a first quad is advantageously delivered before any data for the next quad.

Since each pixel is to be processed in a separate thread, PS collector 514 collects data for P/4 quads (P pixels) to fully populate a SIMD group. Where P is a multiple of 4 (e.g., 16), quads are advantageously not divided between SIMD groups, which simplifies the implementation but is not required. Incoming quads are collected in a buffer in a PS load module 1302 and are loaded into a pixel buffer 1308 in core 310 when the SIMD group is ready to launch, as described below. Like a vertex input buffer, pixel buffer 1308 can be in local register file 404, or global register file 406. Alternatively, each processing engine 402 may have a small local memory that is usable as pixel buffer 1308.

Pixel controller 306 also delivers attribute coefficients (A, B, and C) to shared memory loader 1304. Attribute coefficients are advantageously provided once per primitive, regardless of the number of pixels (or quads) the primitive covers, and shared memory loader 1304 stores the attribute coefficients for each primitive into shared memory 408 of both cores 310 so that the coefficients are available for any SIMD groups associated with that primitive. Operation of shared memory loader 1304 is described below.

In some embodiments, certain attribute coefficients are computed on a per-quad, rather than per-primitive, basis. For instance, attribute coefficients related to depth (z coordinate) may be computed separately for each quad. Such per-quad attribute coefficients are advantageously delivered in the quad stream and treated as per-pixel data.

PS launch module 1306 determines when a SIMD group of PS threads is ready to launch and initiates the execution of the SIMD group by the appropriate one of cores 310. In one embodiment, PS launch module 1306 is generally similar to VS launch module 704 described above. An example of PS launch module 1306 is described further below.

It should be noted that an association between quads and attribute coefficients is advantageously maintained, so that each quad is processed using the appropriate set of attribute coefficients. In one embodiment, an "end of primitive" (EOP) signal is inserted into the attribute coefficient stream following the last set of attribute coefficients for each primitive. (Alternatively, the EOP signal may also be carried on a separate line in parallel with the last coefficient.) Similarly, an EOP signal is inserted into the quad stream following the last quad covered by a given primitive. PS load module 1302 and shared memory loader 1304 each communicate received EOP signals to PS launch module 1306, which maintains appropriate synchronization as described below.

Figure 14:
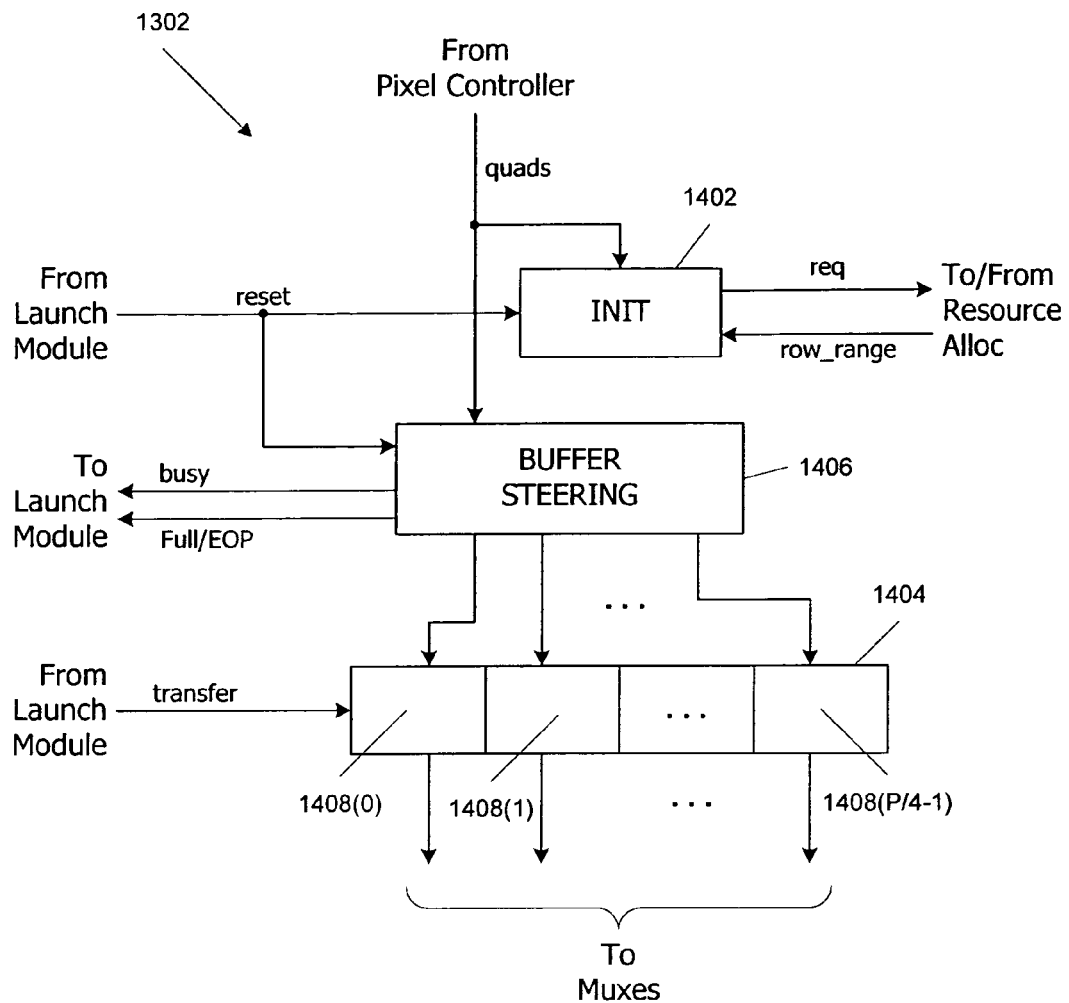
FIG. 14 is a block diagram of a pixel shader load module according to an embodiment of the present invention.

FIG. 14 is a block diagram of PS load module 1302 according to an embodiment of the present invention. PS load module 1302 includes an initialization (NIT) unit 1402, which can be generally similar to initialization unit 902 of VS loader 702 described above. PS load module 1302 also includes a quad buffer 1404 and a buffer steering module 1406 that directs incoming quads into quad buffer 1404.

Initially, PS load module 1302 is in a reset state and has not loaded any pixel data. Pixel data is delivered in quads by pixel controller 306. Initialization unit 1402 detects the first quad and issues a request (req) to resource allocation module 516, requesting resources for a SIMD group that will execute PS threads. As with VS load module 702, PS load module 1302 can delay further operations until a response is received from resource module 516.

Quad buffer 1404 provides P/4 "slots" 1408, each of which has sufficient space to store the per-pixel input data for one quad. As data for each quad is received, buffer steering module 1406 directs the data to the next free slot 1408 in buffer 1404 and asserts a "busy" signal to PS launch module 1306. Buffer 1404 is advantageously arranged such that incoming data is aligned for delivery to the correct locations in pixel buffer 1308. For instance, pixel buffer 1308 can be managed such that data for each pixel occupies a different lane therein (similar to vertex input buffer 800 of FIG. 8A), and buffer 1404 can also be arranged with corresponding lanes that store incoming data for different pixels.

Once all P/4 slots 1408 have been filled, buffer steering module 1406 asserts a "full" signal to PS launch module 1306 and delays steering of any further data, creating backpressure in the pipeline. In one embodiment, buffer steering module 1406 also detects EOP signals in the quad stream and sends a corresponding EOP signal to PS launch module 1306.

After receiving the "full" signal, PS launch module 1306 launches the new SIMD group. The launch process, described further below, includes transferring the quad data from buffer 1404 to pixel buffer 1308 in the selected core 310. After the quad data has been transferred, PS launch module 1306 sends a reset signal to PS load module 1302. The reset signal triggers initialization module 1402 to request a new allocation of resources and also triggers buffer steering module 1404 to begin loading the slots 1408 in buffer 1406 with data for more quads.

PS Thread Launch

Launching of PS threads will now be described. In one embodiment, the launch procedure is generally similar to that for VS threads, except that the input data is transferred to pixel buffer 1308 at launch time and that pixel threads need to be associated with attribute coefficients.

Figure 15:
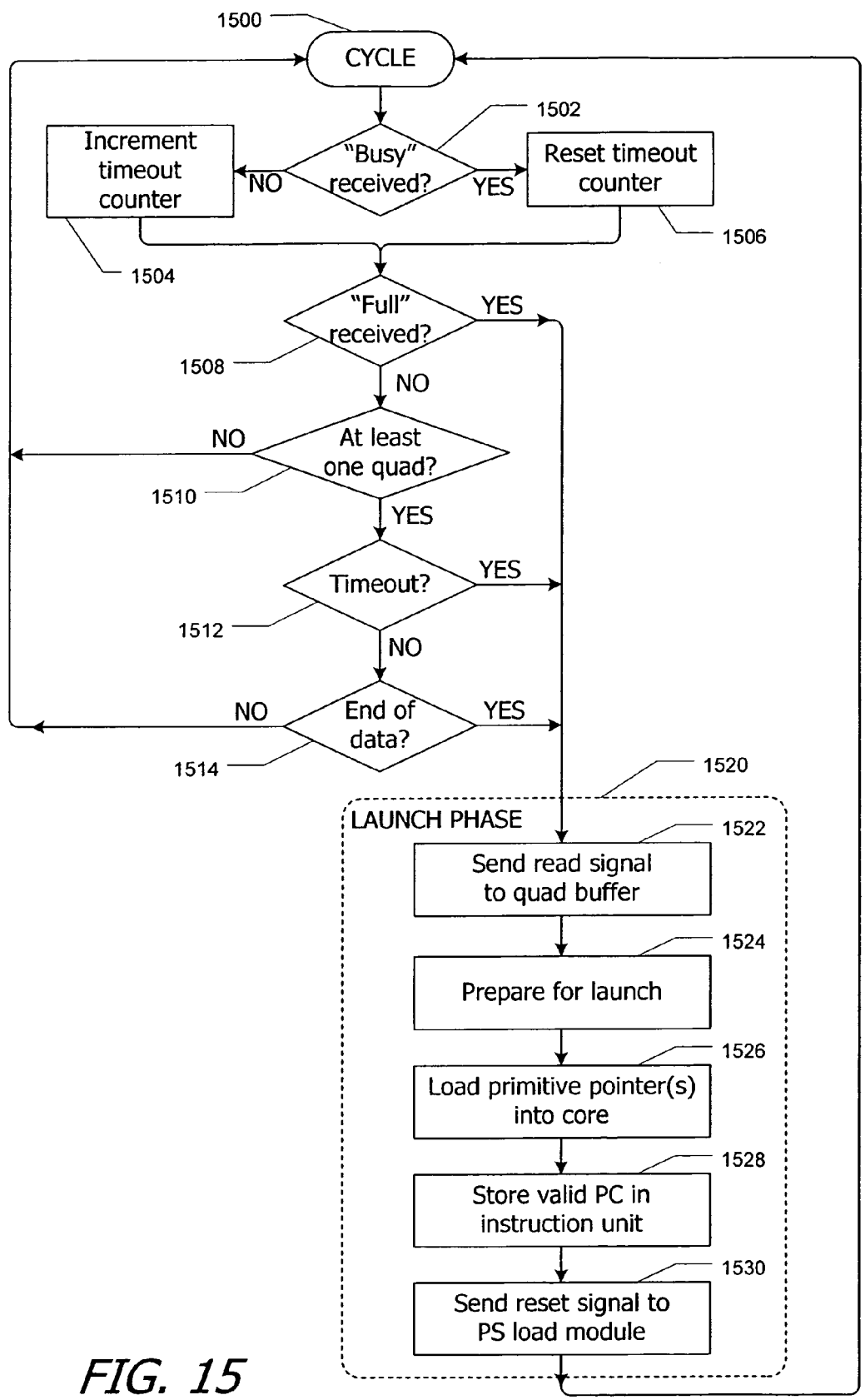
FIG. 15 is a flow diagram of control logic for launching pixel threads according to an embodiment of the present invention.

FIG. 15 is a flow diagram of control logic implemented in PS launch module 1306 according to an embodiment of the present invention. The steps shown herein are repeated on each processor cycle 1500. Briefly, PS launch module 1306 first determines if any launch criteria are satisfied and, if so, moves into a launch phase 1520 in which the SIMD group is launched and PS load module 1302 is reset so that it can begin loading data for the next SIMD group.

More specifically, at step 1502, PS launch module 1306 detects the "busy" signal from buffer steering module 1406 of PS load module 1302 (see FIG. 14). Assertion of the busy signal indicates that PS load module 1302 is receiving and steering quad data into buffer 1404; deassertion of the busy signal indicates that PS load module 1302 is idle, i.e., that quad data is not coming in. If the busy signal is not asserted, a timeout counter is incremented (step 1504); if the busy signal is asserted, the timeout counter is reset (step 1506).

In either case, at step 1508, PS launch module 1306 determines whether the "full" signal has been asserted by buffer steering unit 1404 of PS load module 1302. If so, then PS launch module 1306 enters launch phase 1520.

If the full signal has not been asserted, then at step 1510, PS launch module 1306 determines whether at least one quad is waiting to be launched. In the embodiment of PS load module 1306 described above, this would be the case if all of the data for at least one quad had been loaded into buffer 1404. If no quads are waiting, there is no reason to launch, and PS launch module 1306 waits for the next cycle 1500.

If at least one thread is waiting, then at step 1512, PS launch module 1306 determines whether a timeout has occurred. In one embodiment, PS launch module 1306 compares the value of the timeout counter to a threshold value, which may be a configurable parameter corresponding, e.g., to 5, 10 or some other number of cycles. (It should be noted that the timeout threshold used by PS launch module 1306 may be different from that used by VS launch module 704.) If the counter exceeds the threshold value, a timeout occurs and PS launch module 1306 enters the launch phase 1520.

If no timeout occurs, then at step 1514, PS launch module 1306 determines whether an "end of data" signal has been received. Similarly to the vertex case, an "end of data" signal appears in the quad data stream at any point at which it is desirable to launch all SIMD groups for pixels prior to that point, even if the groups are not fully populated. For example, an end of data signal might appear following the last quad in a scene to be rendered.

An end of data signal might also appear in other circumstances where it is desirable to have a SIMD group launched even if the group is less than fully populated. For instance, in some embodiments, all threads in a SIMD group share the same state information, and an "end of data" signal might be inserted into the quad stream when state information changes; such signals can be detected by PS load module 1302 and forwarded to PS launch module 1306. As another example, in some embodiments, all quads in a SIMD group are required to be associated with the same primitive, and an EOP signal from buffer steering unit 1404 is treated as an end of data signal since any subsequent quads would be associated with a different primitive. Handling of EOP signals by PS launch module 1306 is described further below.

At step 1514, if an end of data signal has been received, PS launch module 1306 enters the launch phase 1520; if not, PS launch module 1306 waits for the next cycle 1500.

If any of the launch conditions described above are met, the launch phase 1520 is entered. Launch phase 1520 includes various steps associated with preparing core 310 to execute the new SIMD group. More specifically, at step 1522, PS launch module 1306 asserts the transfer signal to buffer 1404 of PS load module 1302. In response to this signal, buffer 1404 transfers the collected quad data into the allocated pixel buffer 1308 in the selected one of cores 310; muxes 518 (FIG. 5) are advantageously used in directing the data to the appropriate core 310.

At step 1524, PS launch module 1306 performs final preparations for launch. These preparations may include, e.g., establishing a group index GID for the new SIMD group, allocating scratch space in local register file 404 that can be used by processing engines 402 to store intermediate results generated during execution of the new SIMD group, forwarding current state information related to pixel processing to core 310, and so on. In some embodiments, some or all of these preparations may be performed when pixel data is received, as described above.

At step 1526, PS launch module 1306 loads one or more primitive pointers into core 310. A "primitive pointer" is a pointer to a region of shared memory 408 that stores the attribute coefficients for the primitive to be processed by quads in the SIMD group. As described below, in some embodiments, there is only one primitive pointer per SIMD group; in other embodiments, there may be multiple such pointers. PS launch module 1306 obtains the primitive pointer from shared memory loader 1304 and uses EOP signals received from shared memory loader 1304 and buffer steering circuit 1404 to determine when to start loading a different primitive pointer. If a new primitive pointer is needed but is not yet available, PS launch module 1306 waits until shared memory module 408 delivers the new pointer.

At step 1528, PS launch module 1306 sends a launch command to core 310. The launch command identifies the group index GID of the new SIMD group and also includes references (e.g., pointers) to the region in pixel buffer 1308 where the pixel data is stored and to the scratch space in local register file 404. The launch command also indicates that the new SIMD group has pixel threads. The launch command may also include an active mask indicating which threads have valid input data. In response to the launch command, core 310 begins fetching and executing instructions for the new SIMD group of pixel threads. More generally, a launch command may include any information that enables core 310 to begin executing the new SIMD group, and some or all of this information may be pre-loaded into core 310 prior to sending the launch command. Thus, any action sufficient to notify core 310 that the new SIMD group is ready for execution may be performed at step 1528 in addition to or instead of sending the launch command described herein.

At step 1530, PS launch module 1306 sends a reset signal to PS load module 1302; the reset signal resets PS load module 1302 so that it can begin loading data for a new SIMD group whenever the next quad arrives.

It will be appreciated that the launch control logic described herein is illustrative and that variations and modifications are possible. Logic steps (including the various tests) described as sequential may be executed in parallel, order of steps may be varied, and steps may be modified or combined. Other launch conditions may also be supported as desired. In addition, if launch occurs when only some of the data for a quad has been loaded (e.g., due to a timeout), quads with incomplete data are advantageously marked invalid, and the PS collector (FIG. 7) may be configured to signal an exception.

It should also be noted that because the PS collector described herein does not use memory or register file space in core 310, resource allocation for pixel SIMD groups can be delayed until the SIMD group is ready to be launched. In one such embodiment, PS load module 1302 fills its input buffer regardless of whether resources are available, and PS launch module 1306 requests a resource allocation from resource allocation unit 516 upon entering the launch phase. If sufficient resources are not immediately available, the input data can be held in the buffer of PS load module 1302 while PS launch module 1306 waits for a response from resource allocation unit 516.

Pixel threads, when completed, may transfer their output data to an output buffer in pixel controller 306; the process may be similar to that described above for vertex and geometry threads. Alternatively, pixel threads may leave their final results (color values, depth values and the like) in local register file 404. Once the thread group is finished, core interface 308 transfers the data from local register file 404 to pixel controller 306 before freeing the local register file space for use by subsequent thread groups. Pixel controller 306 forwards the pixel data to ROP unit 214, with or without pre-processing.

Correlating Pixels with Attribute Coefficients

PS launch module 1306 may implement a variety of techniques for correlating a primitive pointer with the quads to be processed using that primitive. In some embodiments, one primitive pointer is provided per SIMD group, and all quads in the SIMD group are associated with the same primitive. In these embodiments, a single primitive pointer can be provided to the processing engines as state information for the SIMD group, with the result that all processing engines read the same attribute coefficients when processing that group. Thus, an EOP signal from buffer steering unit 1406 can be treated as an "end of data" event as described above. If buffer 1404 is not full when the SIMD group is launched, PS launch module 1306 invalidates any threads corresponding to unfilled slots in buffer 1404. Alternatively, PS load module 1302 can, upon detecting an EOP, assert the full signal even if buffer 1404 is not full, in which case PS load module 1302 marks any unfilled slots as being invalid.

In another embodiment, two primitive pointers per SIMD group are supported. In one embodiment, this is done by providing a "first half" pointer and a "second half" pointer in separate state registers that are referenced, respectively, by the first half and second half of the threads in the SIMD group during execution. In this embodiment, when buffer steering unit 1404 detects an EOP signal in the quad stream, it skips ahead to the next half of buffer 1404 2. For example, if P=16, buffer 1404 would have four slots 1408(0), 1408(1), 1408(2), and 1408(3). If an EOP was detected when one slot 1408(0) in buffer 1406 had been populated, buffer steering unit 1404 would skip ahead to slot 1408(2), marking slot 1408(1) as invalid. If the next "half" of buffer 1404 is the end of the buffer, buffer steering unit 1406 would generate a full signal and subsequent quad data would wait for the next SIMD group.

In this embodiment, buffer steering unit 1406 also signals PS launch unit 1306 to indicate whether the current set of quads in buffer 1404 requires one or two different primitive pointers. If all quads require the same primitive pointer, PS launch unit 1306 loads the current pointer into both state registers. If two primitive pointers are required, PS launch unit 1306 loads two different pointers supplied from shared memory loader 1304.

In still another embodiment, each quad can have a different primitive pointer. In this embodiment, a primitive pointer for each thread might be stored in local register file 404 by PS launch unit 1306 prior to launching the threads. Alternatively, the two-pointer mechanism described above can be extended to cover this situation.

Loading Attribute Coefficients into Shared Memory

Shared memory loader 1304 will now be described. As noted above, shared memory loader 1304 advantageously loads every primitive received from color assembly module 212 into shared memory 408. In some embodiments, shared memory loader 1304 manages shared memory 408 as a circular buffer, with the attributes for each new primitive being stored in a contiguous block starting at the next free location and wrapping back to the first location when the end of the buffer is reached. Space is freed for reuse after all pixel threads that require attribute coefficients for a particular primitive have finished. If attribute coefficients arrive at a time when there is not enough space in shared memory 408 to store all the attributes for a new primitive, shared memory loader 1304 advantageously stalls, creating backpressure in the pipeline, until such time as the needed space is freed.

In some embodiments, it is possible for core interface 500 to receive attribute coefficients with no associated quads. When this occurs, two consecutive EOP signals (i.e., two EOP signals with no intervening quads) appear in the quad stream. In some embodiments, shared memory loader 1304 saves space in shared memory 408 by storing attribute coefficients for a primitive only if at least one quad associated with that primitive is received.

Figure 16:
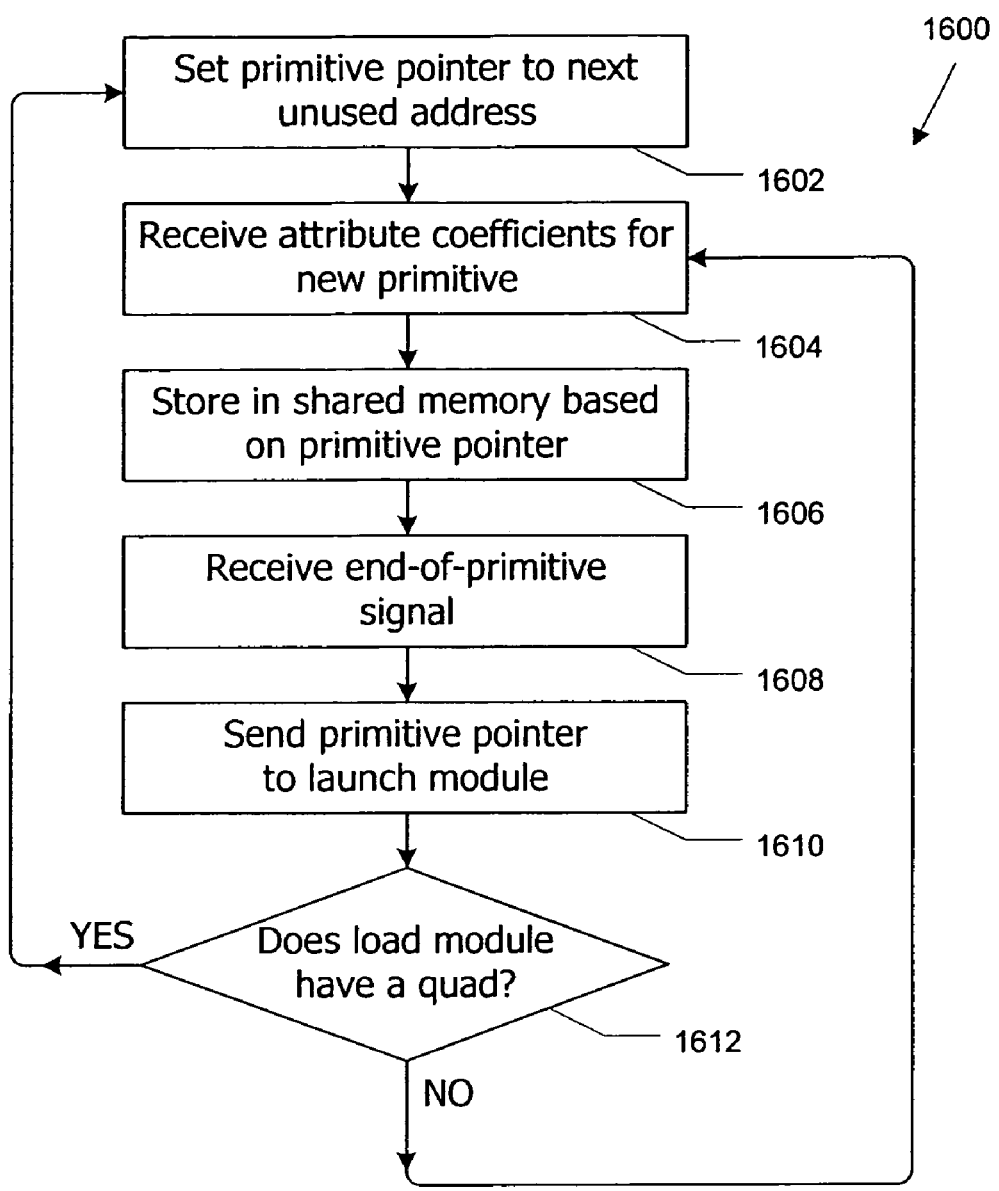
FIG. 16 is a flow diagram showing control logic for storing attribute coefficients in a shared memory according to an embodiment of the present invention.

FIG. 16 is a flow diagram showing control logic implementing this behavior according to an embodiment of the present invention. At step 1602, shared memory loader 1304 sets the primitive pointer (i.e., the pointer to the beginning of a block of space in shared memory 408 that stores the attribute coefficients for a primitive) to the next unused location in shared memory 408. At step 1604, shared memory loader 1304 receives attribute coefficients for a new primitive and stores them (step 1606) in shared memory 408 at a location determined by the primitive pointer. Shared memory loader 1304 continues to receive and store attribute coefficients in shared memory 408 until an EOP signal is detected in the attribute coefficient stream (step 1608). At step 1610, shared memory loader 1304 sends the current primitive pointer, i.e., the pointer to the block where attribute coefficients were just loaded to PS launch module 1306.

At step 1612, shared memory loader 1304 waits for an indication as to whether PS load module 1302 has received at least one quad associated with the newly loaded primitive. In one embodiment, for each cycle, PS load module 1302 signals to shared memory loader 1304 whether it has a quad, an EOP signal, or is idle. If an EOP signal is followed (immediately or after one or more idle cycles) by a quad signal, then PS load module 1302 has at least one quad for which the newly stored attribute coefficients will be needed. Accordingly, shared memory loader 1304 returns to step 1602 and advances the primitive pointer to the next unused location before receiving and loading attribute coefficients for the next primitive.

If an EOP signal is followed (immediately or after one or more idle cycles) by another EOP signal without any intervening quads, then PS load module 1302 has not received—and will not receive—any quads for which the newly stored attribute coefficients will be needed. Accordingly, shared memory loader 1304 returns to step 1604 to receive and load attribute coefficients for the next primitive without first advancing the primitive pointer. The coefficients for the new primitive overwrite the unused coefficients, saving memory space.

It will be appreciated that the shared memory management process described herein is illustrative and that variations and modifications are possible. Steps described as sequential may be executed in parallel, order of steps may be varied, and steps may be modified or combined.

FURTHER EMBODIMENTS

While the invention has been described with respect to specific embodiments, one skilled in the art will recognize that numerous modifications are possible. For instance, the loading and launching mechanisms described herein could be adapted to support other types of threads, such as general-purpose computation threads. As described above, a core interface can support any number of cores (1, 2, or more), and a SIMD group may include any number of threads.

Some embodiments (e.g., as shown in FIG. 3) may provide multiple core interfaces. In such embodiments, processing work can be distributed to core interfaces in any manner desired. Vertex (pixel) data for a given vertex (pixel) is advantageously directed to only one core interface; attribute coefficients can be broadcast to all core interfaces.

Thus, although the invention has been described with respect to specific embodiments, it will be appreciated that the invention is intended to cover all modifications and equivalents within the scope of the following claims.

What is claimed is:

1. A processor comprising:
    a processing core having:
        a plurality of processing engines configured to concurrently execute a plurality of threads arranged in a plurality of single-instruction, multiple-data (SIMD) groups, each SIMD group including up to a maximum number P of threads, where P is at least two, wherein each of the threads in a same one of the SIMD groups executes a same data processing program on a different input object, the same data processing program comprising a sequence of instructions, and different threads in the same one of the SIMD group are executed using different ones of the processing engines;
        a local register file having at least P lanes, wherein each processing engine is configured to access a different subset of the lanes; and
        instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto; and
    core interface logic coupled to the processing core and configured to initiate execution by the processing core of one or more SIMD groups, the core interface logic including:
        a first load module configured to receive a stream of input data blocks defining a plurality of up to P first input objects to be processed and to load the input data blocks into the local register file such that the input data for each one of the first input objects is in a different one of the lanes of the local register file; and
        a first launch module coupled to the first load module and configured to signal the processing core to begin execution of a first SIMD group after loading of the stream of input data blocks defining the up to P first input objects into the local register file is complete, wherein each thread of the first SIMD group processes a different one of the first input objects.

2. The processor of claim 1 wherein the first load module is further configured to load each input data block into the local register file as the input data block is received.

3. The processor of claim 2 wherein each of the input data blocks includes a number of data words, each data word representing a value of a same attribute of a different one of the first input objects, and wherein the first load module is further configured to steer each data word to a corresponding entry in a different lane of the local register file.

4. The processor of claim 3 wherein the number of data words in each input data block is less than P.

5. The processor of claim 1 wherein the first load module includes an input data buffer, the first load module being configured to load the input data blocks into the input data buffer and to transfer the input data from the buffer to the local register file during a launch operation.

6. The processor of claim 1 wherein the core interface logic further includes a resource allocation module configured to allocate a sufficient amount of a resource in the processing core for use in processing each SIMD group.

7. The processor of claim 6 wherein the first load module is further configured to request an allocation of resources for the first SIMD group from the resource allocation module in response to receiving a first input data block in the stream and to delay receiving further input data blocks until a response to the request is received from the resource allocation module.

8. The processor of claim 6 wherein the resource includes space in the local register file.

9. The processor of claim 1 wherein the core interface logic further includes a shared memory load module configured to receive a stream of shared input data to be used by more than one of the threads of the first SIMD group and to load the shared input data into a shared memory in the processing core, and wherein the first launch module is further configured to provide to the processing engines a reference to a location in the shared memory where the shared input data to be used during execution of the threads of the first SIMD group is stored.

10. The processor of claim 1 wherein the core interface logic further includes:

a second load module configured to receive a stream of input data blocks defining a plurality of up to P second input objects to be processed and to load the input data blocks into the local register file such that the input data for each one of the second input objects is in a different one of the lanes of the local register file; and a second launch module coupled to the second load module and configured to signal the processing core to begin execution of a second SIMD group after loading of the stream of input data blocks defining the up to P second input objects into the local register file is complete, wherein each thread of the second SIMD group processes a different one of the second input objects.

11. The processor of claim 10 wherein the first input objects are vertex objects and the second input objects are pixel objects.

12. A processor comprising:

a plurality of processing cores, each processing core having:

a plurality of processing engines configured to concurrently execute a plurality of threads arranged in a plurality of single-instruction, multiple-data (SIMD) groups, each SIMD group including up to a maximum number P of threads, where P is at least two, wherein each of the threads in a same one of the SIMD groups executes a same data processing program on a different input object, the same data processing program comprising a sequence of instructions, and different threads in the same one of the SIMD groups are executed using different ones of the processing engines;

a local register file having at least P lanes, wherein each processing engine is configured to access a different subset of the lanes; and instruction issue logic configured to select one of the SIMD groups and to issue one of the instructions of the same data processing program to each of the plurality of processing engines in parallel, wherein each processing engine executes the instruction in parallel with each other processing engine using the subset of the local register file lanes accessible thereto;

core interface logic coupled to more than one of the processing cores and configured to initiate execution by a selected one of the processing cores of one or more SIMD groups, the core interface logic including:

a first load module configured to receive a stream of input data blocks defining a plurality of up to P first input objects to be processed and to load the input data blocks into the local register file of the selected one of the processing cores such that the input data for each one of the first input objects is a different one of the lanes in the local register file; and a first launch module coupled to the first load module and configured to signal the selected one of the processing cores to begin execution of a first SIMD group after loading of the stream of input data blocks defining the up to P first input objects into the local register file is complete, wherein each thread of the first SIMD group processes a different one of the first input objects.

13. The processor of claim 12 wherein the core interface logic is further configured to select the one of the processing cores into which the input data blocks are loaded.

14. The processor of claim 12 wherein the core interface logic is further configured to receive a signal selecting the one of the processing cores into which the input data blocks are loaded.

15. A method for executing a plurality of data-processing threads in a multithreaded processor, the method comprising:

receiving a stream of input data blocks defining a plurality of input objects to be processed, wherein each input object is to be processed by a different thread in a multithreaded processing core having a plurality of processing engines, the processing core being configured to concurrently execute a plurality of threads arranged in a plurality of single-instruction, multiple-data (SIMD) groups, each SIMD group including up to a maximum number P of threads, where P is at least two, wherein each of the threads in a same one of the SIMD groups execute a same data processing program on a different input object, the same data processing program comprising a sequence of instructions, and different threads in the same one of the SIMD groups are executed using different ones of the processing engines;

allocating a sufficient number of entries in each of a plurality of lanes in a local register file of the processing core to store the input data for up to P input objects, wherein each lane is accessible by a different one of the processing engines;

loading the input data blocks into the allocated entries such that the input data for each one of the input objects is in a different one of the lanes of the local register file;

subsequently to loading the input data blocks, signaling the processing core to begin execution of a first SIMD group; and executing the first SIMD group in the processing core, wherein executing the SIMD group includes selecting the first SIMD group from among the plurality of SIMD groups and, when the first SIMD group is selected, issuing one of the instructions of the same data processing program to each of the plurality of processing engines in parallel, wherein each processing engine executes the instruction in parallel with each other processing engine, each processing engine executing the instruction using the local register file lane accessible thereto.

16. The method of claim 15 wherein the act of allocating is performed in response to receiving a first input data block.

17. The method of claim 16 wherein the input data blocks are loaded directly into the allocated space.

18. The method of claim 17 wherein the stream of input data blocks includes:

a first input data block including a plurality of first data words representing a first attribute of the object for each of a first subset of the input objects; and a second data block including a plurality of second data words representing a second attribute of the object for each of the first subset of the input objects, wherein the act of loading the input data blocks includes:
loading the first data words into respective first entries in each of a first subset of the lanes in the register file; and
loading the second data words into respective second entries in each of the first subset of the lanes in the register file.

19. The method of claim 15 further comprising:
storing the input data blocks in a buffer as they are received, wherein the act of loading the input data blocks includes transferring the input data blocks from the buffer to the allocated entries.

20. The method of claim 19 wherein the act of allocating is performed in response to the buffer becoming filled with input data blocks.

21. The method of claim 15 further comprising:
receiving shared input data to be used by more than one of the threads; and
loading the shared input data into a shared memory in the processing core.

* * * * *